United States Patent

Commerford et al.

[11] Patent Number: 6,134,671
[45] Date of Patent: Oct. 17, 2000

[54] SYSTEM AND METHOD FOR DYNAMICALLY GENERATING RESTORATION ROUTES WITHIN A COMMUNICATIONS NETWORK

[75] Inventors: G. L. Commerford; William D. Croslin, both of Colorado Springs, Colo.

[73] Assignee: MCI Communications Corporation, Washington, D.C.

[21] Appl. No.: 08/904,095

[22] Filed: Jul. 31, 1997

[51] Int. Cl.[7] ............................................. H02H 3/05
[52] U.S. Cl. ..................... 714/4; 714/3; 714/7; 714/8; 714/13; 714/15; 714/16; 370/216; 370/217; 370/218; 370/221; 364/238.1
[58] Field of Search ....................... 714/3, 4, 7, 8, 714/13, 15, 16; 370/216, 217, 218, 221; 364/238.1

[56] References Cited

U.S. PATENT DOCUMENTS

| | | |
|---|---|---|
| 4,937,825 | 6/1990 | Ballard et al. .................. 364/238.1 |
| 4,956,835 | 9/1990 | Grover .............................. 370/228 |
| 5,313,628 | 5/1994 | Mendelsohn et al. .............. 395/575 |
| 5,548,639 | 8/1996 | Ogura et al. ...................... 370/221 |

*Primary Examiner*—Robert W. Beausoliel, Jr.
*Assistant Examiner*—Pierre Eddy Elisca

[57] ABSTRACT

A system and method is disclosed for dynamically restoring communications within a network following an outage comprising a database containing the configuration of switching elements within the network and a plurality of instructions resident on a memory device for operating a control computer, wherein the plurality of instructions includes a code segment for receiving network parameters following the outage, a code segment for selecting restoration switching elements from the database based upon the network parameters, a code segment for generating connect and disconnect commands for the restoration switching elements, and a code segment for sending the connect and disconnect commands to the restoration switching elements, thereby restoring communications within the network.

12 Claims, 14 Drawing Sheets

400

| Node | End | Links | End | Links |
|------|-----|-------|-----|-------|
| A | D | 2 | | |
| | | 1 = type-A | | |
| | | 1 = type-B | | |
| C | D | 5 | | |
| | | 4 = type-A | | |
| | | 1 = type-B | | |
| D | A | 2 | C | 5 |
| | | 1 = type-A | | 4 = type-A |
| | | 1 = type-B | | 1 = type-B |

440 points to the table; 442 points to the Links column.

FIG. 13

SYSTEM AND METHOD FOR DYNAMICALLY GENERATING RESTORATION ROUTES WITHIN A COMMUNICATIONS NETWORK

TECHNICAL FIELD OF THE INVENTION

This invention relates, in general, to the restoration of network information systems, and in particular to, a system and method for dynamically generating restoration routes to restore network communications following a network outage using real-time network architecture data.

BACKGROUND OF THE INVENTION

Without limiting the scope of the present invention, the background is described in connection with telecommunication networks.

Telecommunication networks serve a vital role in both the public and private sectors. For example, businesses and individuals rely on these sophisticated networks to transport information, both voice and data, from one location to another. Of particular importance to both businesses and individuals is the reliability and cost of communicating via the telecommunications infrastructure. For example, if an outage occurs within a telecommunication network, vast amounts of information may be lost coupled with the substantial costs associated therewith.

Network outages develop when a discontinuity occurs within the network architecture. A discontinuity within the network may result for reasons such as, a natural disaster, accidental or intentional human intervention, or faulty network components. Regardless of the cause of the network outage, however, the communication within the network must be restored as promptly as possible to avoid unnecessary and costly disruptions in communication.

Presently, restoration of communications service is implemented by selecting alternate routes within the network which are not effected by the outage. Typically, a restoration pre-plan is used. These pre-plans are developed from network topology information which is periodically gathered and stored. It has been found, however, that due to the rapid and continuous nature of changes to the architecture of networks, the data used to prepare the pre-plans and therefore the pre-plans themselves may be obsolete before they are implemented. When a pre-plan is unsuccessful, an audit of the network architecture is required to a new restoration plan. This ad-hoc approach to restoration of communications, however, has been found to take an unacceptably long period of time.

Therefore, a need has arisen for a reliable, efficient and cost effective method for restoring communication after a network outage occurs. A need has also arisen for a method of maintaining real-time information regarding network architecture. Further, a need has arisen for a system and method for dynamically generating restoration routes following an outage, based upon accurate network architecture information.

SUMMARY OF THE INVENTION

The present invention disclosed herein comprises system and method that reliably, efficiently and cost effectively restores communication within a network after a network outage has occurred. The system and method of the present invention dynamically generates restoration routes following an outage based upon accurate network architecture information stored in a database that is updated in real-time with the current network architecture.

The system and method of the present invention comprises a database containing the configuration of switching elements within a network and a plurality of instructions resident on a memory device for operating a control computer. The database consists of individual partitions corresponding to each of the switching elements which are updated in real-time such that each partition reflects the current configuration of the corresponding switching element within the network.

The plurality of instructions includes code segments that direct the control computer to identify an outage and dynamically implement a restoration route to restore communication within the network. The system and method of the present invention receives network parameters following an outage which are prioritized based upon the type of traffic carried on the effected trunks. A database of broken network segments is then built based upon the network parameters. A database of spare switching elements is also generated based upon information from the database containing the configuration of switching elements. These databases may be continuously updated in real-time to assure accuracy.

The system and method of the present invention then selects restoration switching elements from the database containing the configuration of switching elements based upon the network parameters. Connect and disconnect commands are then generated. The connect and disconnect commands form a plurality of different restoration routes which may be used for a single outage. One of such routes is then selected. The corresponding connect and disconnect commands are then sent to the restoration switching elements to restore communications within the network. Additionally, the system and method of the present invention receives responses from the switching elements to determine whether the restoration was successful.

BRIEF DESCRIPTION OF THE DRAWINGS

For a more complete understanding of the present invention, including its features and advantages, reference is now made to the detailed description of the invention, taken in conjunction with the accompanying drawings in which like numerals identify like parts and in which:

FIG. 13 is a table generated by a dynamic route generator component of the present invention;

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1:
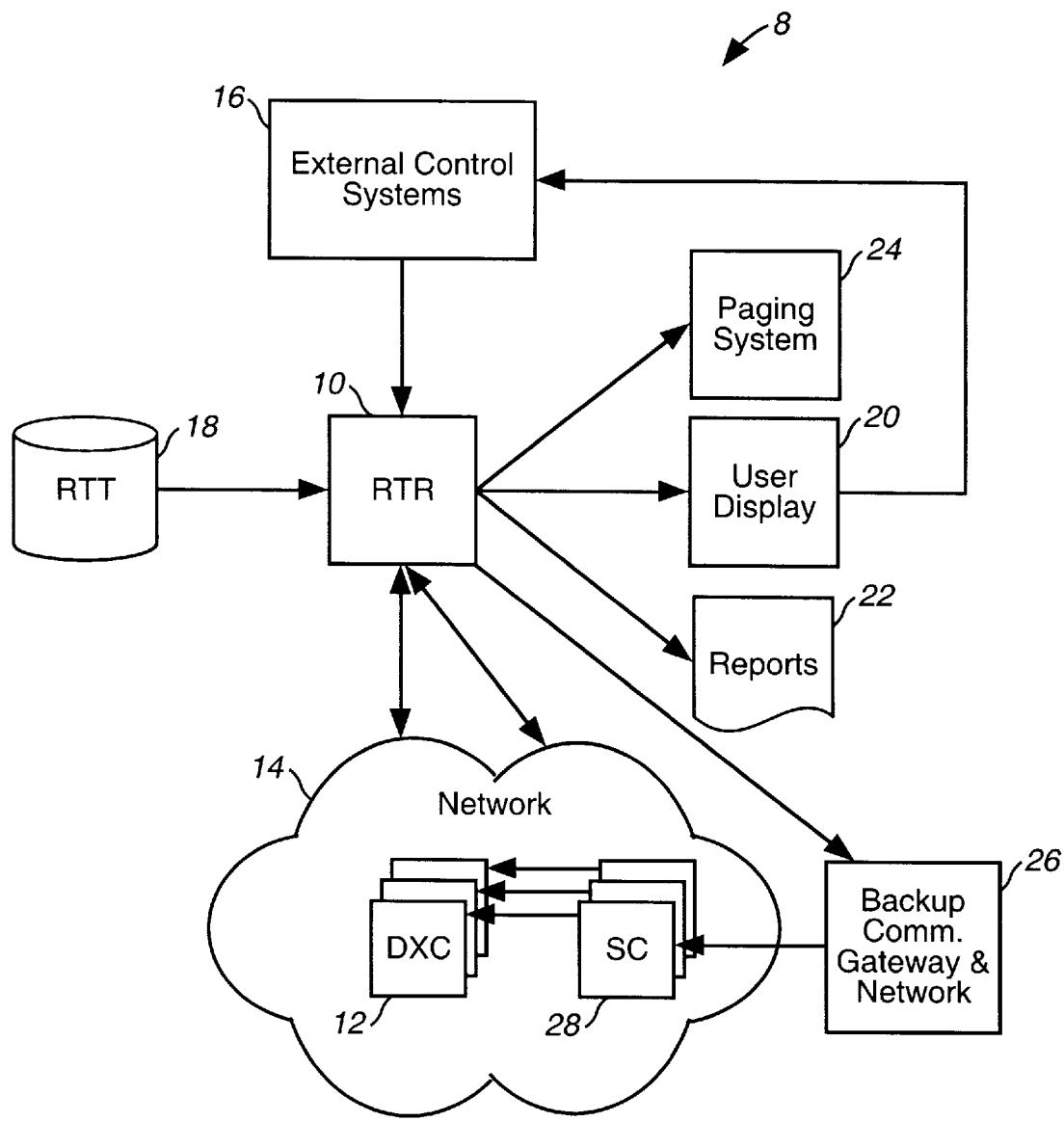
FIG. 1 is an architectural diagram depicting a network restoration system of the present invention.

Referring now to FIG. 1, a high level network restoration architectural diagram illustrating the use of the present invention is shown and denoted generally as 8. Real time restoration (RTR) 10 is a software application that may be implemented on a high-performance midrange computer, such as, but not limited to, a DEC Alpha running with a Open VMS or VMS operating system. Alternatively, RTR 10 may be implemented on other types of computers or on multiple computers in a distributed architecture. It is also desirable to have two or more redundant, remotely located RTR 10 systems, one running as primary and the others as backup, for survivability purposes. RTR 10 is designed to accommodate this functionality with automated execution state designations, as will be described later.

The restoration network 8 may be implemented within a telecommunications network 14 with a plurality of network switching elements, such as a Digital Cross-Connect (DXC) 12. DXC 12 may be used to reroute information carrying lines in the event of an outage. Switching is performed based on commands generated and provided by RTR 10.

Network 14, which may be a protocol specific network, is used to transmit RTR 10 commands to each DXC 12. The network 14 is also used to transmit command responses and alarms, generated by the DXC 12, to RTR 10. Other means for communications through the network 14 between the RTR 10 and the DXC 12 may be used.

RTR 10 has an interface with one or more external control systems 16. These external control systems 16 represent any system or collection of systems that are used to create, store, and upload restoration pre-plans; provide a means for user input, such as selection of restoration mode (dynamic or pre-plan) and selection of pre-plans; and provide a means for user display of data. For example, user input to the RTR 10 may be achieved through a personal computer (PC) or workstation (WS). Other automated input, such as restoration pre-plans, may be through another computer, such as an IBM mainframe.

It is possible to realize external control systems 16 on the same computer as RTR 10. The RTR 10 may interface with external control systems 16 on the same computer as RTR 10 via messaging to and from internal VMS mailboxes. Alternatively, the RTR 10 may interface with external control systems 16 on other computers, by way of DECNet messaging, when RTR 10 is implemented on a DEC Alpha computer.

RTR 10 also receives input from a real-time topology (RTT) database 18. RTT 18 contains data on the topology of network 14 including all components and trunks of network 14. This data is updated in real-time, so as to reflect the most current state of the network 14. RTR 10 is only interested in topology data as it pertains to a physical restoration network 14. Therefore, some processing is required within RTR 10 to extract and properly represent the data that is relevant to restoration. This will generally include data on DXC 12 devices and their inter connectivity.

Since RTT 18 contains data on all network 14 topology, it is typically stored and maintained external to RTR 10, as it has many purposes and uses independent of RTR 10. RTR 10 is designed to use data from RTT 18, for convenience of use, and to keep an internal store of select data relevant to restoration. This internal store of restoration data will be described later, in reference to FIG. 3 and FIG. 5.

RTR 10 is designed with a means for presenting results of restoration, and other data, to the user via a user display 20. This user display 20, which may be a graphical user interface (GUI), can be on the same computer as the external control system 16 for user input, which is generally a PC. This is conducive for purposes such as providing the user with a list of restoration options, then accepting the user's selection of an option.

Thus, while FIG. 1 shows the logical breakdown of components based on functionality, many functions, such as user display 20 and user input 16, may be realized on the same computer. Typically, other external control systems 16, such as development and maintenance of pre-plans, are realized on a different computer for performance reasons. However, it is possible to realize all external control systems 16 on a single computer.

RTR 10 is also designed with a means for producing reports 22. These reports 22 detail the results of restoration, error messages, other system messages, and other data desired by the user. Reports 22 may be customized to the user's needs. RTR 10 provides the means and data for generating such reports 22.

RTR 10 is also designed with a means for issuing a page to a developer if certain error messages are produced within RTR 10. An interface to a paging system 24 provides the means for delivering the page.

RTR 10 may also include a backup communications system with the DXCs 12. While network 14 provides primary communications through a pair of redundant binary data links to each DXC 12, a backup communications gateway and network 26 may be used to communicate with each DXC 12 in the event that primary communications fail. The backup communications gateway and network 26 provides data links to each DXC 12 by way of a site controller (SC) 28, one of which is located at each DXC 12 site. When RTR 10 detects failure in the primary communications, RTR 10 automatically shifts to the backup communications to reach the DXCs 12.

Using the architecture shown in FIG. 1, RTR 10 can support both a pre-plan and a dynamic restoration methodology on a common system platform. For a pre-plan methodology, pre-plans are developed on an external control system 16, such as an IBM mainframe. Pre-plans are then downloaded to another external control system 16, such as a PC.

When RTR 10 detects a network outage, it notifies the user through the user display 20 which may be a PC. The user may then select to utilize a pre-plan, or utilize dynamic restoration. If the user selects a pre-plan, the PC uploads that pre-plan to RTR 10, which proceeds to implement it. To implement a pre-plan, RTR 10 reads the actions from the pre-plan, which are stored in a generic format in a file, translates these actions to actual DXC 12 commands, and issues these commands to the DXC 12. Results of the pre-plan implementation are then provided to the user display 20. If the user selects dynamic restoration, RTR 10 proceeds to generate a restoral route dynamically. RTR 10 then implements that restoral route by issuing commands to the DXC 12 devices, and notifies the user of results.

Figure 2:
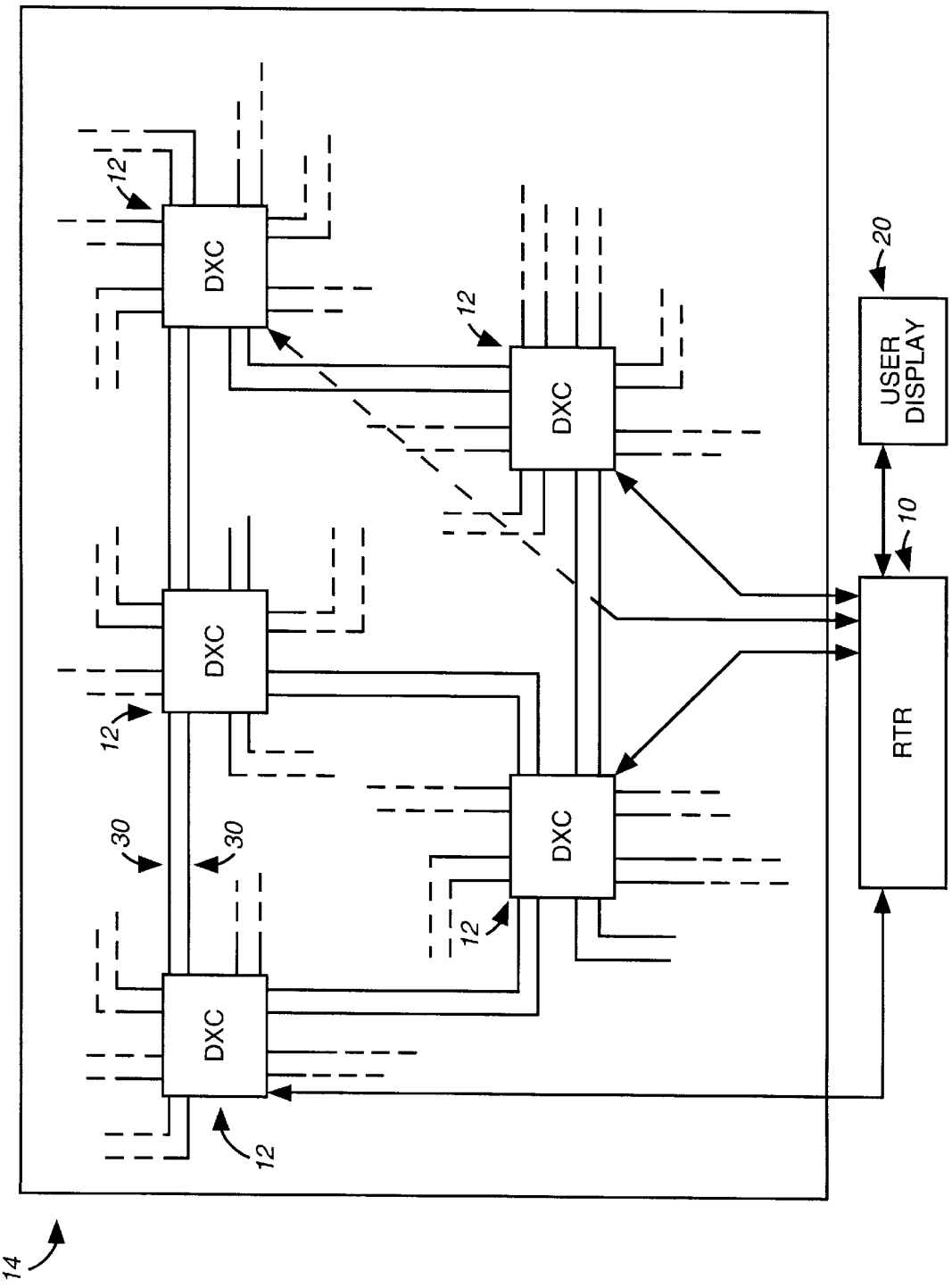
FIG. 2 is a schematic illustration of a typical network architecture.

Referring now to FIG. 2, a high level depiction of a network architecture consisting of network elements 12 is depicted and denoted generally as 14. Network 14 consists of a plurality of network elements, such as DXCs 12. The DXCs 12 within FIG. 2 can be bi-directional switching elements that are used to route information to a predetermined destination. For example, digital data, such as information distributed to and from LAN or WAN, digital voice data, such as telephone communication, and digital images, such as video conferencing. The DXCs 12 within a network 14 are memory resident within a logical topology, i.e., information concerning the configuration of each device is resident within memory of the RTR 18 database. The RTR 10 in FIG. 2, with the aid of the RTR 18 logical topology, is capable of determining the most efficient and cost effective route for restoration of service to the customer. The RTR 10 is only concerned with the RTR 18 topology that is available for restoration of traffic.

Information travels between two DXC 12 on trunk segments 30. Data flows in either direction down each trunk segment 30 with a predetermined destination. The DXCs 12 are capable of re-routing network data based on instructions from the RTR 10 and information associated with data that travel through the network 14. The destination routes for data are determined based on information regarding data type and destination.

Network communication problems usually occur when a disruption occurs within trunk segment 30. For example, segment 30 of network 14 could be disrupted due to a natural disaster, such as lightning striking a control center or from accidents cause by operating heavy equipment around trunk segment 30 which tears through trunk segment 30. Once service has been disrupted, DXCs 12 associated with the trunk segments 30 that are effected will be isolated and a restoration route is initiated by a pre-plan restoration route or by dynamically generating a restorable route with the RTR 10 in the most efficient and cost effective manner.

An alarm is generated by DXCs 12 when, among other things, a discontinuity or outage occurs within a trunk segment 30. The RTR 10 determines the validity of the alarm and the DXCs 12 generating the alarm to isolate the effected segments 30 and identify alternate routes to restore service. Factors effecting restoration lie within the boundaries of availability and costs.

Figure 3:
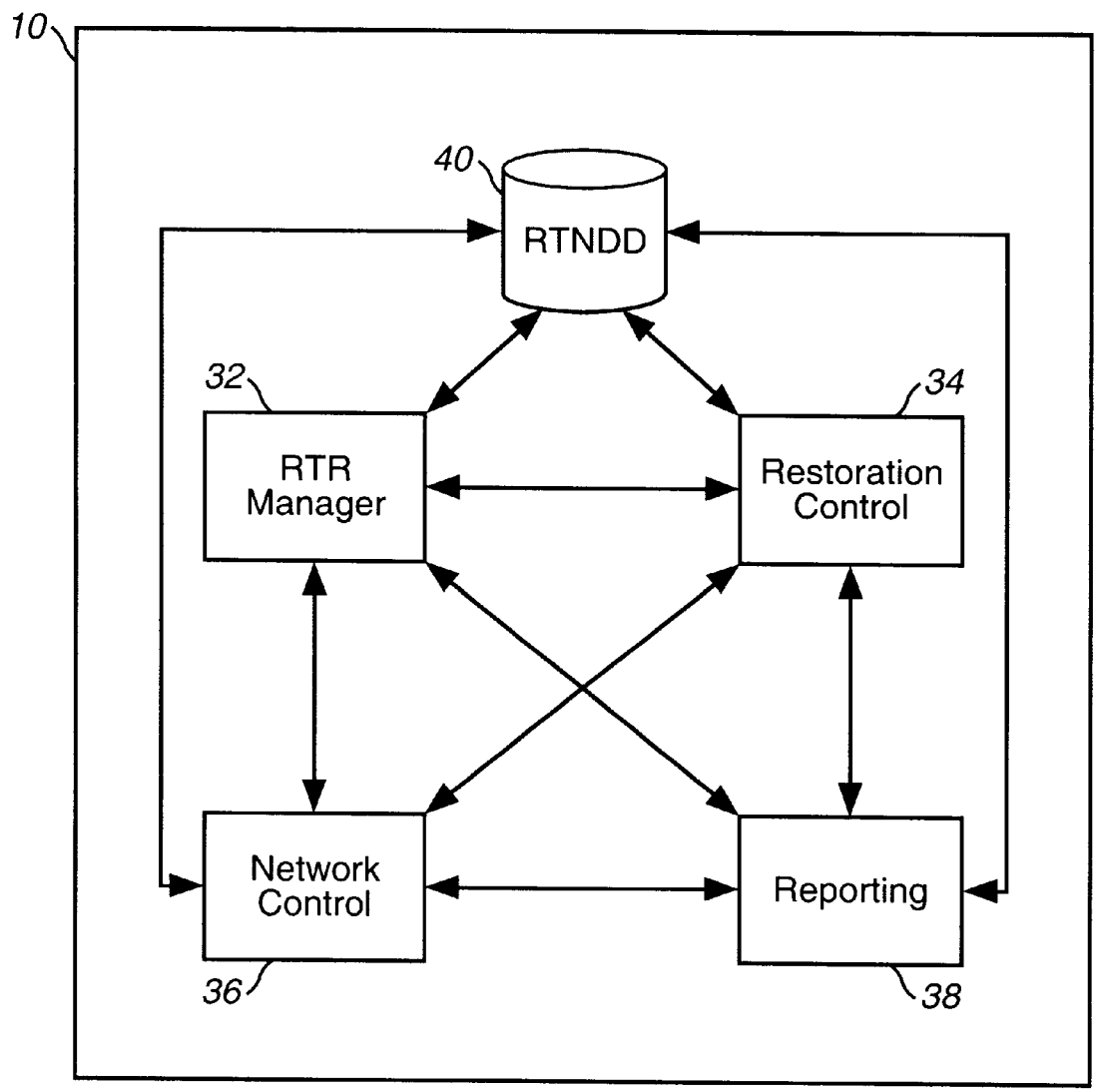
FIG. 3 is a block diagram illustrating an internal architecture of a network restoration system of the present invention.

FIG. 3 is a block diagram illustrating the high-level internal architecture of RTR 10. RTR 10 is comprised of four main process components which are an RTR manager 32, a restoration control 34, a network control 36, and a reporting component 38. Each of these components represent a collection of software processes. In addition, certain data elements are used by these components. Each component, consisting of several distinct processes and data elements, are shown in detail and described in reference to FIGS. 3–6.

Process components in RTR 10 can communicate with each other through messages that are passed among internal VMS mailboxes. Each process, several of which make up each high-level component shown in FIG. 3, has its own identifiable mailbox address. Using these mailbox addresses, each process can communicate with any other process by sending a properly addressed message. To aid in the convenience of inter-process communications, each high-level component shown in FIG. 3 has a process coordinator component that is responsible for, among other things, distributing messages to other processes within the same high-level component.

In addition to individual data elements used by each process component, the RTNDD 40, a centralized database containing restoration network device data is used. The RTNDD 40 contains data that reflects each restoration device, such as each DXC 12. It is organized such that each DXC 12 has its own partition within RTNDD 40, and within each DXC 12 partition are individual data elements for each DXC 12 port.

The RTNDD 40 is updated in real-time by the RTR manager 32 with the most current data reflecting the DXC 12 network. It is used by many different process components within RTR 10, as will be described in reference to FIGS. 5–8.

The RTR manager 32 provides a single interface to external control systems 16. This includes all external control systems 16, the RTT 18, and the user display 20. The only exception are the DXCs 12 via the network 14 and the backup communications network 26 which interface directly with network control 36.

RTR Manager 32 also provides centralized control of the RTR 10 system. It receives commands from the external control systems 16, and distributes the commands to internal processes. It also ensure responses are returned when needed. RTR manager 32 is responsible for receiving data from RTT 18, and updating and maintaining data in the RTNDD 40. The RTR manager 32 is described and shown in detail in FIG. 5.

Restoration control 34 is responsible for performing the algorithms for actual network restoration, including route generation for dynamic restoration. Using topology data from the RTNDD 40, restoration control 34 analyzes alarms received from the DXCs 12 and isolates the location of an outage. Restoration control then generates restoration routes for each impacted trunk 30, and sends commands needed to implement restoration routes to network control 36. Restoration control 34 is described and shown in detail in FIG. 6.

Network control 36 provides the interface to the DXC 12 Network. Network control 36 receives commands for DXCs 12 in a generic format from restoration control 34. Network control 36 may also receive commands from external control systems 16 through the RTR manager 32. Network control 36 then translates commands in this generic format to device-specific formats, and issues these commands to the appropriate DXCs 12. Network control 36 also receives responses and unsolicited alarms from DXCs 12, and distributes these to appropriate processes within RTR 10. Network control 36 manages the communications with the DXCs 12 using binary data links over the network 14, as well as backup communications 26. Network control 36 is described and shown in detail in FIG. 7.

Reporting 38 is responsible for generating all reports 22, issuing pages to a paging system 24, and providing data to the user display 20. Reporting 38 is described and shown in detail in FIG. 6.

There may be more than one instance of RTR 10, each instance running on a separate computer at a different physical location. This is for survivability of the RTR 10 system. However, only one instance of RTR 10 can have control over the restoration process, including communications with DXCs 12, at any one time. Therefore, each instance of RTR 10 runs in one of two execution states: primary and backup. Only one instance of RTR 10 runs in primary state at any time; and it is this instance that has control over the restoration process and maintains communications with the DXCs 12. All other instances of RTR 10 run in backup state. If the primary RTR 10 fails, a backup RTR 10 automatically take over.

The RTR 10 that is running in primary execution state runs in one of two readiness modes at any time. The two readiness modes are "ready" and "alert". Ready mode is the nominal mode. In ready mode, RTR 10 performs normal processing, including DXC 12 audits and RTNDD 40 updates. When a network outage is declared by RTR 10, based on receiving alarms from the DXCs 12, that meet certain criteria, RTR 10 changes to alert mode. In alert mode, all unnecessary processing, such as audits, cease and RTR 10 prepares to perform processing required for restoration.

Additionally, the RTR 10 that is running in primary execution state can be run with dynamic route generation (DRG) 25 enabled or disabled. This can be selected by the user. When DRG 25 is enabled, restoration control 34 performs dynamic restoration by generating a restoration route in real-time. When DRG 25 is disabled, restoration control 34 performs a restoration pre-plan, which is input by the user. When an outage is detected by RTR 10 and its location has been isolated, RTR 10 presents to the user a list of impacted trunks. The user, through an external control system 16, either selects dynamic restoration (DRG 25 enabled), or selects to use pre-plans (DRG 25 disabled). As noted before, all user input is received by the RTR manager 32 and distributed to other processes, such as those in the restoration control 34.

Figure 4:
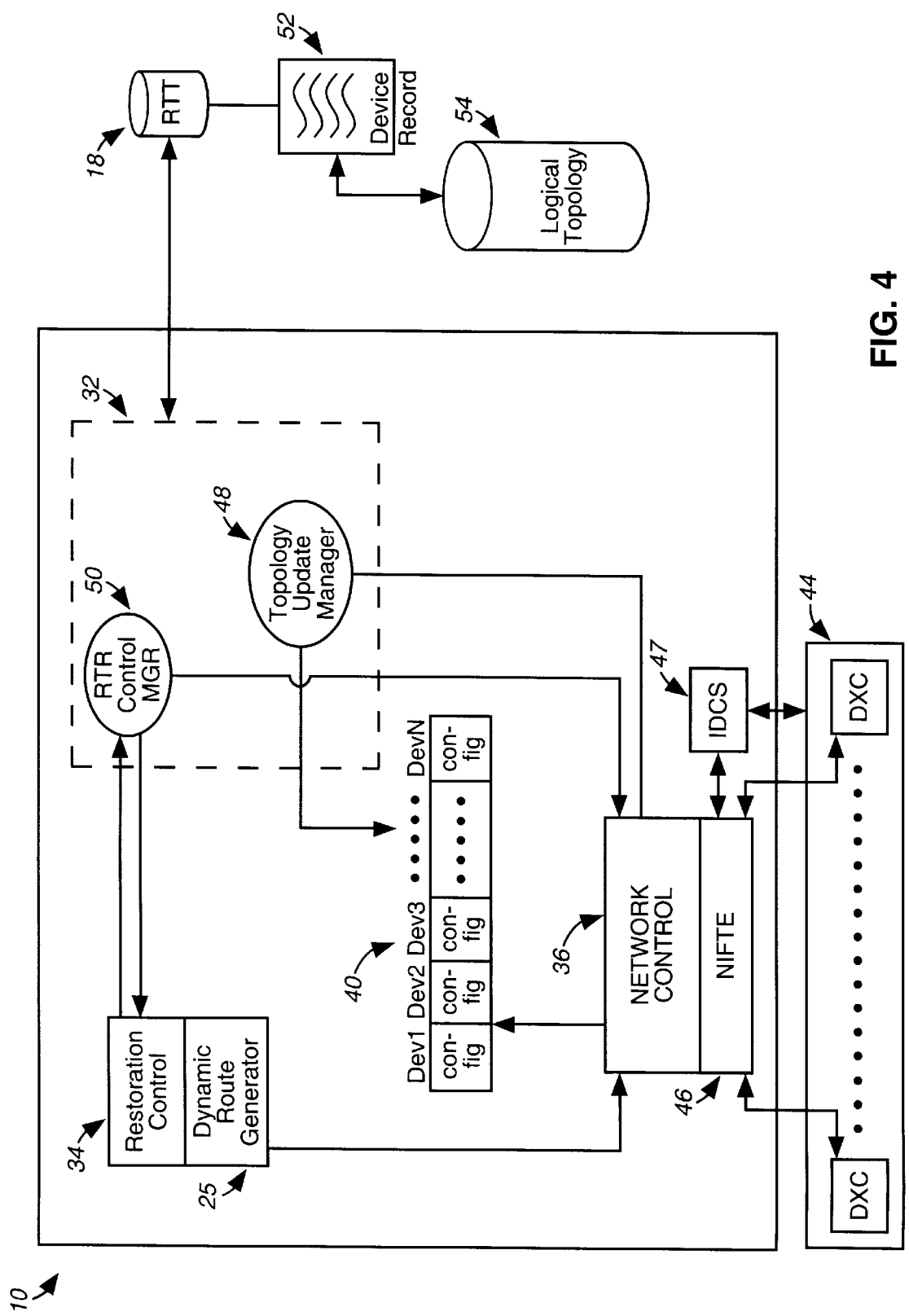
FIG. 4 is a block diagram of software components of a network restoration system of the present invention.

Now referring to FIG. 4 which is a block diagram of the software components that make up the structure of RTR 10, and in one embodiment the components that interface to the RTR 10. The components unique to the RTR 10 application, but not comprising the totality of the RTR 10 application, consists of: network control 44, network item front end (NIFTE) 46, RTNDD 40, topology update manager 48, RTR control manager 50, and restoration control 34.

The components that interface with the RTR 10 are the RTT 18, which maintains the logical topology 54 of the physical networks current status, and the network elements that make up the physical topology 44, such as the DXCs 12. The physical topology 44 is the actual network structure. The logical topology 54 is a virtual topology stored in the RTT 18 database consisting of binary records containing the current configuration of the physical database based upon user inputs. The physical topology 44 is based upon reporting of the network elements, such as DXCs 12, interfaced through network control 36.

Network control 36 is the process component within the RTR 10 application that communicates with the DXCs 12 through the NIFTEs 46. NIFTEs 46 maintain links between DXCs 12 and network control 36. The links allow network control 36 to distribute commands, such as connect and disconnect commands, to the DXCs 12. NIFTEs 46 receive communications from network control 36 in a nonspecific format and translates such information into a device specific format prior to sending commands to DXCs 12. Information is sent from DXCs 12 to NIFTEs 46 in a device specific format which NIFTEs 46 translates into a non-specific format which is sent to network control 36. An alternate link to each DXCs 12 allows communication to proceed if the first link fails. Network control 36 provides required network device status to the RTNDD 40 database following audits of network 14.

The functionality of network control 36 encompasses link management, interface control, issuing connect and disconnect commands, alarm notification, and audit of a network architecture. Network control includes and manages an administration link, an audit link, a connect and disconnect link, and an alarm link. These are logically defined functions that perform evaluation tests and analysis on network elements, such as DXCs 12, via the links that are established between network control 36 and the network elements. Administration commands set the DXC 12 identification, downloads alarm specifications, and determines the types of DXC 12 within the network architecture. The audit link acquires information about each DXC 12, such as how many ports are on a particular DXC 12, the current configuration of the ports, what ports are cross connected to what ports, the availability of the ports, the status of the ports, and the alarm state of the ports. The audit provides the latest and most current configuration of the DXCs 12 which is needed by the higher level applications. The connect and disconnect channel is reserved primarily for issuing connect and disconnect commands during an outage. The alarm link issues alarm notification if a port goes into alarm. Unsolicited alarms are also sent through an alarm link. RTNDD 40 is the repository of all this information.

RTNDD 40 is an internal database memory resident to RTR 10. The RTNDD 40 is a series of memory partitions, each partition representing a DXC 12. For example, if there were 117 DXCs 12 there would be 117 entries containing information on the status of each DXC 12. The information contained within each device slot is broken down into specifics of the device. RTNDD 40 contains a header of information which identifies each DXC 12. The RTNDD 40 also contains DXC 12 configuration information including the number of port entries for each DXC 12, the type of port, such as data type, and whether the port is provisioned as spare capacity or traffic. RTNDD 40 identifies which port is currently cross connected to another port within the DXC 12.

Network control 36 provides for the verification of spare trunk connectivity. Network control 36 ensures operational readiness of all network links though a system of messages that check for network device functionality. Network control 36 can abstract the specifics of the network hardware by providing a device independent command set which will allow control of any type of DXC 12 device. Network control 36 provides a front end interface, the NIFTEs 46, to the RTR 10 controlled network devices.

The NIFTEs 46 translate the hardware independent commands into the appropriate device specific command. NIFTEs 46 provide asynchronous alarm notification to any requesting RTR 10 component. NIFTEs 46 configure and audit the DXCs 12 such that only one full audit is required at the initial connection to the DXC 12. Subsequently, the DXCs 12 will be configured such that any DXC 12 configuration changes will trigger alarms which the corresponding NIFTE 46 will accept and record the configuration change or initiate the appropriate audit. This approach is called audit by exception and is designed to significantly reduce the processing burden on the RTR 10. NIFTEs 46 will support multiple software and hardware versions of the DXCs 12. NIFTEs 46 may issue several device commands, update the RTNDD 40, receive unsolicited alarms, receive new NIFTE 46 commands, and finally receive a response to the commands issued.

The connection from network control 36 to each DXC 12 consists of two redundant diverse paths. There is a third link to the DXCs 12 within the network 14 in case the primary two links of communication fail. The IDCS 47 provides this service to network control 36. This link is much more limited but it is a alternate path which can be used to issue connect and disconnect commands from RTR 10 to DXCs 12.

The update manager 48 updates the RTNDD 40, with regard to the partitions within the device record that contain the information or status about each DXC 12. The RTNDD 40 contains the information of all the DXCx 12 within the network topology. The update manager 48 updates the RTNDD 40 in real time to reflect the current status of the network topology.

Restoration control 34 encapsulates the functions that load and analyze network responses, accepts user and network break specifications, presents pre-plan lists in response to break specifications, and accepts a pre-plan specification for execution. In addition, restoration control 34 isolates breaks from real-time alarms received from the DXCs 12, generates routes for the break spec specified, and submits the routes for execution. The primary data elements of restoration control 34 are DXC 12 alarms, breaks, break specifications, routes, plans, and actions.

A DXC 12 alarm may be, for example, a notification from the DXC 12 that the status of a port has changed. A break is a complete collection of break specifications and includes an indication of the end of a break. Each break has a unique ID. A break specification is a message that specifies that a trunk break has been detected and may include a break location if the trunk break was successfully isolated between two DXC 12 ports. A route is the collection of actions required to restore a break specification. A plan is a collection of actions designed to restore a break. An action is an instruction to perform an intra-DXC 12 connect or disconnect between two ports. Breaks are isolated to a port level. Inactivity over a period of time indicates the end of a break. After break isolation has completed, routes are generated based on trunk priority order and dispatched to network control 36 for transfer to the DXC 12.

Figure 5:
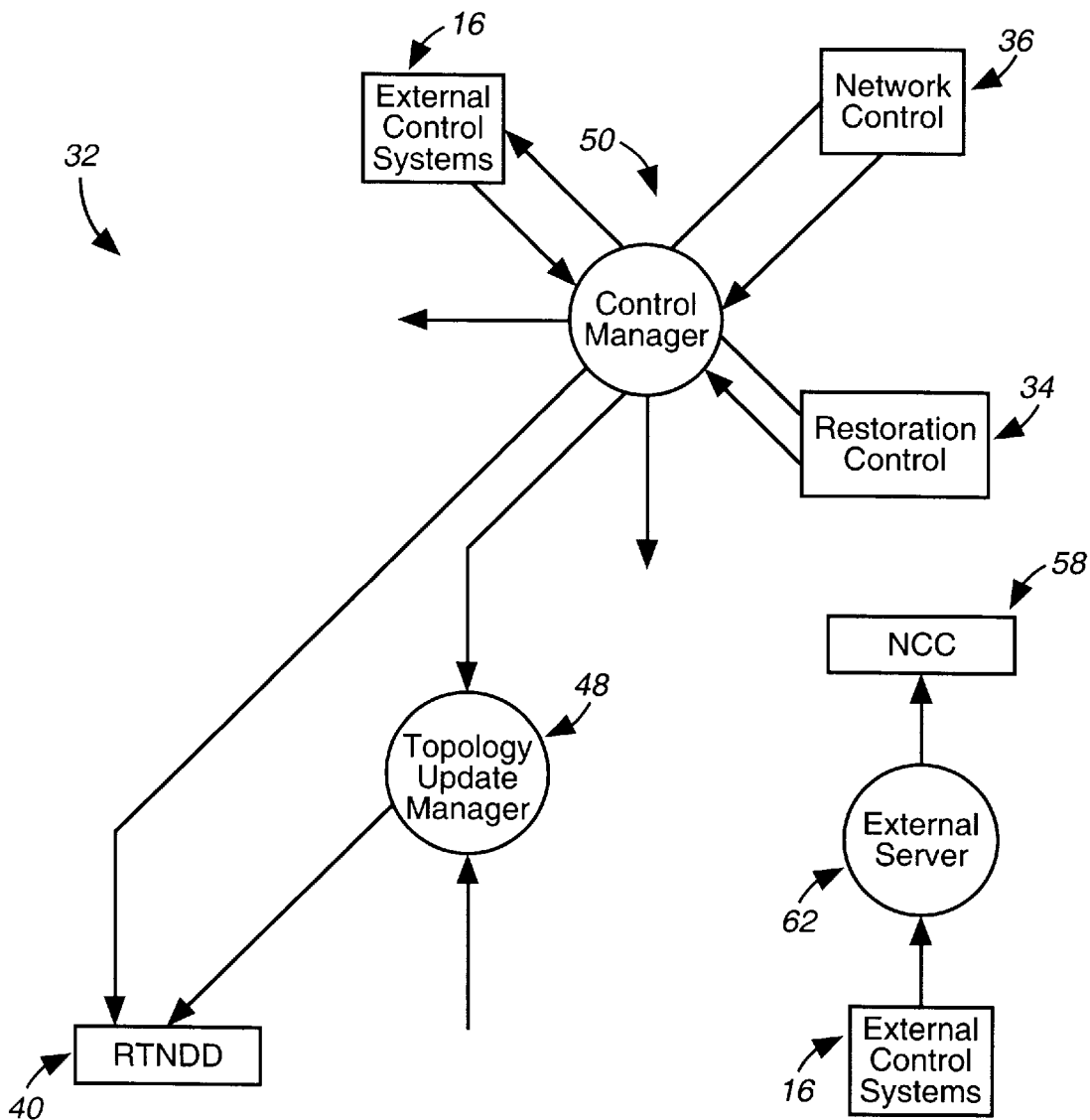
FIG. 5 is a block diagram of a control manager component of a network restoration system of the present invention.

FIG. 5 illustrates in detail the logical architecture of the RTR manager 32. Shown in FIG. 5 are the individual process components and the messages each process sends and receives. As noted before, each process can send messages to and receive messages from other processes.

There are two primary components unique to the RTR manager 32, a control manager 50 and a topology update manager 48. The control manager 50 serves as the interface to external systems. Control manager 50 receives commands from external control systems 16, distributes these commands to the appropriate internal processes, and ensures responses are returned when needed. For example, control manager 50 distributes commands to restoration control 34 and to network control 36. Control manager 50 can also distribute commands that are generated internally by RTR 10. Control manager 50 sends data to external systems as messages identified by internal commands.

Each command sent by control manager 50 to network control 36 has a corresponding response. For example, control manager 50 may send the following commands to network control 36. A command, which is provided by either a user or an external control system, that directs RTR 10 to change its execution state from primary to backup, or from backup to primary. This change in execution state is usually a result of a primary RTR 10 failing, and restoration control making a transition over to a backup RTR 10. Control manager 50 tracks the current execution state of each RTR 10 as an internal data parameter. In addition to updating the internal data parameter with the current execution state, control manager 50 notifies other processes of the change in execution state, which may result in starting up or shutting down of processes. This is done by sending messages to various internal control processes to either initiate processes for startup, or to terminate them for shut down.

Other commands are generated internally in RTR 10 and sent to control manager 50 when a network 14 outage is declared. A network 14 outage is declared when alarms received by DXCs 12 meet certain criteria, such as a specific number of alarms in a time interval. These criteria are used to eliminate spurious alarms that do not indicate an outage. When a network 14 outage is declared, control manager 50 sends out a command to change the readiness mode of RTR 10 from "ready" to "alert". In alert mode, all unnecessary processing, such as device audits and topology data updates, cease. When the outage is cleared, control manager 50 sends out a command to change the readiness mode of RTR 10 back to "ready". Control manager tracks the current readiness mode as an internal data parameter.

There are commands that instruct network control 36 to start and stop NIFTE 46 processes. A NIFTE 46 process is a component of network control 36 that serves as a communications interface with a DXC 12. There is a distinct instance of a NIFTE 46 process for each DXC 12. The start/stop NIFTE 46 commands can be generated internally upon startup of the RTR 10 system, or can be provided by an external system to request connection to a new DXC 12.

Commands are used and provided by an external control system 16 that instructs network control 36 to initiate, for example, a remote spares verification (RSV) process 56. The RSV process 56 is part of network control 36, and is described in reference to FIG. 5. External control systems 16 may also instruct network control 36 to initiate an audit of one or more DXC devices 12. This audit is performed by the NIFTE 46 component of network control 36, but the command message is sent to a network control coordinator (NCC) 58 component for distribution. This command is a request for a data read of the RTNDD 40, to be performed by the NIFTE 46.

Figure 7:
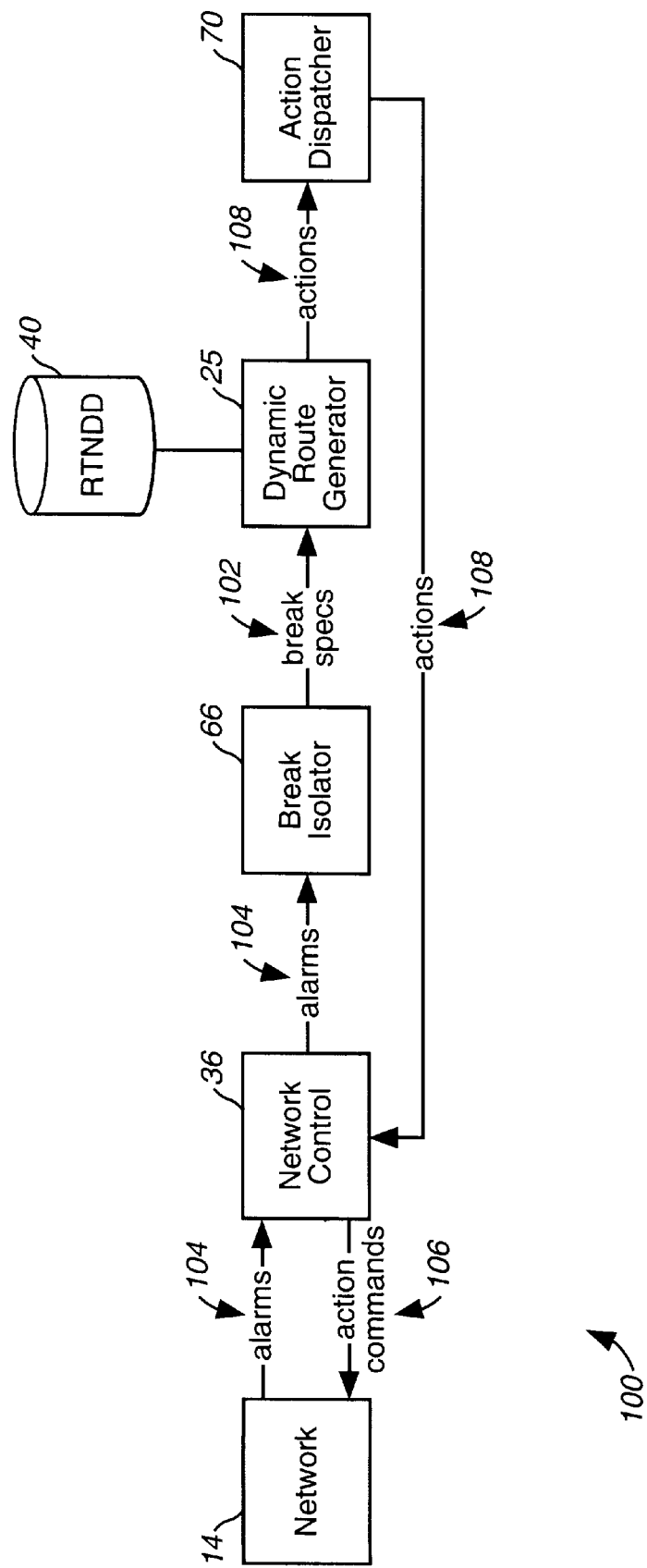
FIG. 7 is a block diagram of a dynamic route generator component of the present invention in a network restoration system.

The NCC 58 serves as the main interface and message distributor for the network control 36 component, and is described in reference to FIG. 7.

Commands received by control manager 50 and distributed to the restoration control 34 interface include the following: The change execution state command as described previously, the change DRG mode command, which instructs restoration control 34 to enable or disable DRG 25. When DRG 25 is enabled, restoration control 34 performs dynamic restoration. When DRG 25 is disabled, restoration control 34 performs pre-plan restoration. Control manager 50 tracks the current DRG 25 mode as an internal data parameter.

After an outage is cleared, a normalization plan is sent to the restoration control 34 to return the DXCs 12 to their original state prior to the outage. This normalization plan is sent from the user display (20) system (PC) or (WS) directly to the restoration control 34. In addition to responses to change execution state and change DRG mode commands, the control manager 50 receives from restoration control 34 a restoration status message. This message provides data on the current status of a restoration process.

The topology update manager (TUM) 60 is responsible for updating data in the RTNDD 40. TUM 60 receives external data on network 14 topology from RTT 18. TUM 60 makes appropriate updates to RTNDD 40. The TUM 60 also receives messages from the NIFTEs 46 indicating that the results of a DXC 12 audit are not consistent with what is reflected in the RTNDD 40 for that DXC 12. While the NIFTE 46 is responsible for making some updates to RTNDD 40, the TUM 60 is responsible for making other updates. If the NIFTE 46 notes an inconsistency of data in the RTNDD 40 for which it is not responsible for updating, it will send a request to the TUM 60 to reconcile the data in the RTNDD 40.

An external server 62 may serve as a front-end focal point to control manger 50 for receiving input from and providing output to external systems. The external server 62 may be incorporated into the control manager 50. Additional messages sent directly by this component, as shown in FIG. 5, may include a command that registers an external system as a client for alarms received. External systems, as well as internal RTR 10 processes, can register to receive certain types of alarms. When network control 36 receives alarms from DXCs 12, it determines a list of alarm recipients, and distributes the alarms accordingly.

The external server 62 may send commands to the NCC 58 that request the NIFTEs 46 to issue a port connect or port disconnect command to a DXC 12. While the restoration control 34 component generates these commands to implement a restoral route, RTR 10 may also receive these commands from external control systems 16.

Figure 6:
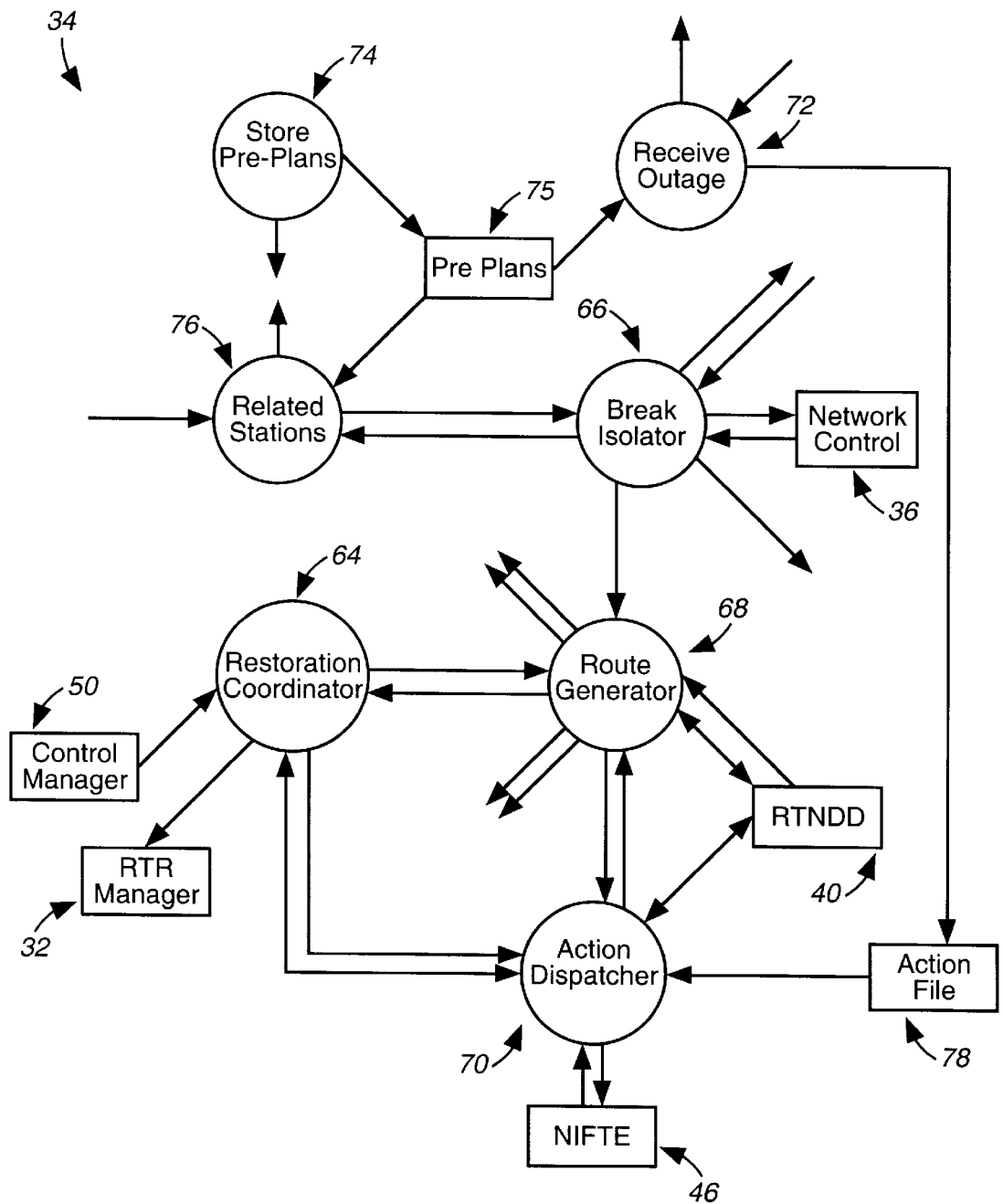
FIG. 6 is a block diagram of a restoration control component of a network restoration system of the present invention.

FIG. 6 illustrates in detail the logical architecture of restoration control 34. Restoration control 34 is comprised of four key components, restoration coordinator 64, break isolator 66, route generator 68, and action dispatcher 20.

The restoration coordinator 64 serves as the main interface for all processes within restoration control 34. When RTR 10 starts up and is placed in primary execution state, the restoration coordinator 64 establishes communication with each of the other restoration control 34 process components. The restoration coordinator 64 receives commands from external control systems 16 via the control manager 50, and distributes them to the appropriate processes within restoration control 34. Distribution of commands to other processes often requires a specific timing and sequence, which the restoration coordinator 64 controls. The restoration coordinator 64 also communicates restoration status to the RTR manager 32.

The break isolator 66 is responsible for receiving DXC 12 alarms from network control 36, identifying the trunk 30 impacted (both traffic trunks and spares), and isolating the location of the outage, or break.

When a network 14 outage occurs, DXCs 12 sends unsolicited alarms to RTR 10. These alarms are received by NIFTEs 46 and passed on to the break isolator 66 in messages. The break isolator 66 collects alarms and maintains a list of active alarms.

The break isolator 66 registers for receipt of all alarms and it sends a message to network control 36. This message instructs network control 36, and specifically the NIFTEs 46 to send the break isolator 66 alarms generated by DXCs 12. NIFTEs 46 return a response message to confirm. The break isolator 66 then begins receiving alarms from the network 14. Alarms will be received even when no outage has occurred. These alarms are spurious, and may be generated for a variety of reasons, such as detection of a weakened signal.

The break isolator 66 applies certain criteria to active alarms to determine if an outage has occurred. Such criteria includes the number of alarms received in a time interval. The break isolator 66 also waits a predetermined time before declaring an outage. The break isolator 66 uses topology data from the RTNDD 40 to correlate alarms to determine if multiple alarms are related and uses tunable thresholds to determine if alarms are a probable result of an outage. The break isolator 66 then determines the location of the outage to a trunk segment 30 between two restoration devices, typically DXCs 12. The break isolator 66 then sends this specification of the outage to the route generator 68. If DRG 25 is disabled, and restoration pre-plans are to be used, the break isolator 66 tracks the list of impacted trunks to ensure each one is successfully restored by a pre-plan.

The route generator 68 receives break specifications from the break isolator 66 and generates restoral routes, if DRG 25 is enabled.

The route generator 68 first sends a restoration status message to the restoration coordinator 64, indicating that restoration is in process. This triggers the restoration coordinator 64 to notify the control manager 50 to place RTR 10 in a readiness mode of "alert."

Route generator 68 reads data from RTNDD 40, and uses this data to determine an optimal restoral route for each impacted trunk based upon traffic trunk priorities. This determination should take into account the costs of different restoral routes. Such cost data is derived. For example, based upon capacity type number of segments, distance, and the number of connections.

RTNDD 40 is also queried for a list of available spare trunks that can be used for restoral routes. If a break specification is received for a spare trunk, the route generator 68 updates RTNDD 40 to indicate this spare is broken and is not available for restoral routes.

When a restoral route is determined, route generator 68 identifies each port on each DXC 12 that is needed for the restoral route and formulates commands needed to implement the route which generally comprise port connects and disconnects in DXCs 12. These commands are in a generic format, in that they refer to DXC 12 devices and ports in a generic manner. These generic commands will be translated to actual commands needed for specific DXC 12 by the NIFTEs 46. Route generator 68 creates a file of these commands, and then provides this file to the action dispatcher 70.

The action dispatcher 70 receives commands from the route generator 68 for implementing the restoral route. The action dispatcher 70 distributes these commands directly to the NIFTEs 46, bypassing the NCC 58 for performance reasons. Since there is an individual NIFTE 46 process running for each DXC 12, the action dispatcher 70 must distribute individual commands to certain NIFTE 46 processes.

If DRG 25 is disabled, the route generator 68 does not perform any route generation. The action dispatcher 70 receives an action file 78 from receive outage 72. The action file 78 contains actions needed to implement a restoral route. These actions are in the same format as those received from route generator 68, except they have been specified by a restoration pre-plan. The action dispatcher 70 distributes these commands to individual NIFTEs 46.

Restoration control 34 also consists of other components used in the pre-plan restoration process. load preplans 74, and receive outage 72 are used to download appropriate restoration pre-plans 75 from an external control system 16, and submit them to action dispatcher 70 for implementation. Thus, the present invention combines the ability to execute pre-plans with a dynamic network restoration system on the same platform. Restoration control 34 is responsible for initiating the main processing loops of the other components. This is performed at startup of RTR 10 by receiving a message from the control manager 50.

Alternative to the processes previously described, the break isolator 66, when it has compiled a list of impacted trunks, may present this list to the user via the user display 20. RTR 10 then allows the user to either select a pre-plan 75 for each trunk or to select dynamic restoration.

If the user selects DRG 25, then the break isolator 66 sends the break specification to the route generator 68. The route generator 68 proceeds with dynamic restoration, as previously described. If the user selects a pre-plan 75, then the break isolator 66 does not need to determine the location of the impacted trunk segments 30. There will be a pre-plan 75 provided for the outage. These pre-plans 75 are downloaded and provided by the load pre-plans 74 and receive outage 72 components. They are provided directly to the action dispatcher 70 in an action file 78. However, the break isolator 66 maintains the list of impacted trunks to ensure each one gets restored. If a pre-plan 75 does not get implemented successfully, the break isolator 66 will present the impacted, unrestored trunks to the user again, and allow the user to select either another pre-plan 75, or dynamic restoration.

In FIG. 7 a block diagram illustrating an example of the present invention's use in a network restoration system and is denoted generally as 100. Network 14 including DXCs 12 carries telecommunication traffic and can be used to re-route traffic in the event of an outage 104. The ports of a DXC 12 are built such that if they detect a loss of signal, a degradation of signal, or a change in signal type, they will generate an alarm 104.

Port alarms 104 are sent to network control 36, which serves as the interface to RTR 10. Network control 36 is a software component that performs communications management, data translations, and protocol conversions. Network control 36 passes alarms 104 on to a break isolator 66.

The break isolator 66 receives port alarms 104 that were generated on network 14. The break isolator 66 performs various processes to filter out alarms 104 that are not a result of an outage 402. The break isolator 66 identifies all trunks 30 impacted by an outage 402, and isolates the location of the outage 402 between two DXCs 12. The break isolator 66 identifies the number of separate outages 402 if there is more than one outage 402.

The break isolator 66 then produces break specifications 102. These specifications 102 are messages that specify each trunk 30 that requires restoration, the logical topology of each trunk 30, and the DXCs 12 on each trunk 30 which are necessary for restoration. These are the two DXCs 12 between which the break isolator 66 has isolated the outage 402, usually the two DXCs 12 nearest the outage 402.

The break specifications 102 produced by the break isolator 66 are then sent to the DRG 25. The DRG 25 prioritizes all impacted trunks 30 in accordance with the type of traffic they carry. Trunks 30 that carry the highest priority traffic will be restored first. The priority of trunk 30, along with data on network topology, are obtained from RTNDD 40. RTNDD 40 contains data that identifies each restoration DXC 12 in the network 14. This data includes identification of each DXC 12, identification of each port within each DXC 12, internal cross-connectivity of ports, external inter-connectivity of ports, and other configuration data. The RTNDD 40 also specifies current states of DXCs 12 and ports, which includes alarms states.

The DRG 25 then generates restoration routes for each trunk 30. The DRG 25 uses topology data from the RTNDD 40 to determine where spare capacity is available for restoration routes. The DRG 25 also uses data from the RTNDD 40 that specifies the type of spare capacity available. Each type of spare capacity has an associated cost, and the DRG 25 uses cost factors to generate the most cost-efficient restoration routes. The DRG 25 also uses the data from the break specification 102 to identify which DXCs 12 will be used to restore traffic to trunks 30.

Restoration routes are specified by the DXCs 12 that comprise the routes. The DRG 25 must then identify each port on each DXC 12 that will be needed for each restoration route. The DRG 25 uses DXC 12 data from the RTNDD 40 to identify these ports. The DRG 25 also uses data from the RTNDD 40 that specifies the current state of each DXCs 12, in order to determine what actions 108 are needed by the network 14 in order to implement each restoration route. These actions 108 are generally port cross-connects and disconnects.

The DRG 25 then compiles a list of actions 108 that are needed to implement each route. These actions are provided to an action dispatcher 70. The action dispatcher 70 dispatches the actions 108 to the network control 36. Network control 36 formulates device-specific commands that specify these actions 108, and then issues these action 108 commands to network 14. Once the action 108 is sent to the DXCs 12, the action dispatcher 18 sets a timer and waits for a response from the DXCs 12. If no response is received or if a failure response is received, a new list of actions 108 will be generated by DRG 25. If the response from the DXCs 12 indicate success, DRG 25 has completed the restoration process and the results reports. If the response from DXCs 12 indicates failure, DRG 25 must repeat the process using an alternate restoration route which may be attempted a specified number of times.

Figure 8:
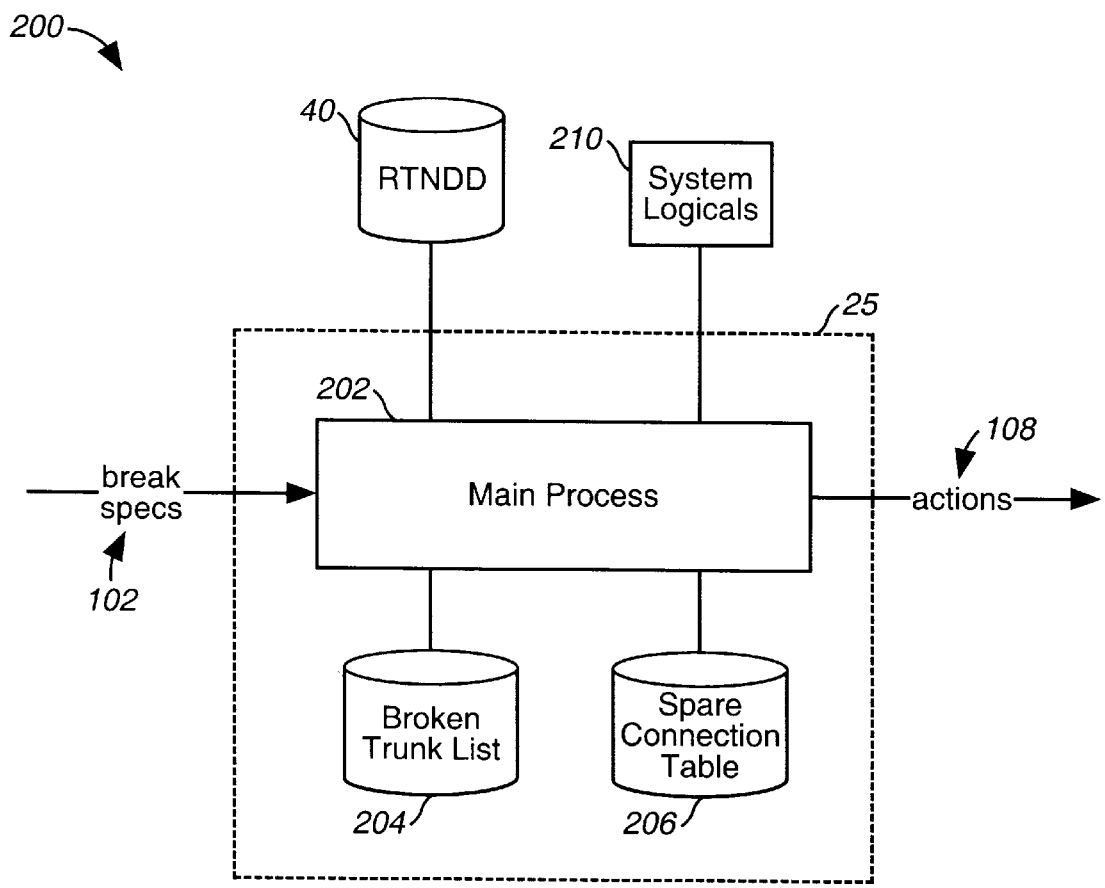
FIG. 8 is a block diagram of the component parts of a dynamic route generator component of the present invention.

FIG. 8 illustrates the architecture of the DRG 25 and is denoted generally as 200. The DRG 25 is responsible for receiving break specifications 102 from a break isolator 66, generating restoration routes for each broken trunk 30, compiling a list of actions needed to implement these restoration routes, and sending these actions 108 to an action dispatcher 70.

When DRG 25 receives break specifications 102 from the break isolator 66 or the restoration control coordinator 64, DRG 25 generates restoration routes to restore communication in response to an outage 402. DRG 25 stores break specifications 102 for trunks 30 in priority order. Restoration routes for effected trunks 30 are based on this priority order. The DRG 25 consists of a main process 202, which is shown in detail in FIGS. 9 through 11. Main process 202 receives break specifications 102 from the break isolator 66. The main process 202 uses real-time data from the RTNDD 40, which is preferably maintained external to the DRG 25, but may be embodied within the DRG 25.

The main process 202 reads some data parameters, and updates others, within a store of system logicals 210. System logicals 102 specify run-time parameters for RTR 10. These may include the mode of operation, execution state.

The DRG 25 also maintains an internal broken trunk list 204. When the DRG 25 receives break specifications 102, the DRG 25 not only prioritizes the trunks 30 but also keeps a list of trunks in the broken trunk list 204. In addition the DRG 25 builds and maintains a spare connection table 206.

The spare connection table 206 specifies the spare capacity available for restoration. The DRG 25 is responsible for supplying the spare connection table 206 with available spare capacity for restoration and building a list of DXCs 12 relevant to available spare capacity. DRG 25 defines the costs associated with the available restoration routes in the spare connection table 206. Excluded from the spare connection table 206 are any of the spares that could be impacted by an outage 402 which must be excluded during the restoration process.

DRG 25 uses the concept of origin with respect to the outage 402, because the DXCs 12 that are in closest proximity to the origin of the outage 402 should be identified and used for rerouting traffic. The DRG 25 determines the available DXCs 12 outside the effected trunk segments 30 and builds a route that doesn't exceed guidelines for maximum length nor impose extra costs to the supplier or consumer based upon cost information from the spare connection table 206. Once DRG 25 has determined the best possible restoration route a list of actions 208 is created and transmitted to an action dispatcher 70.

Figure 9:
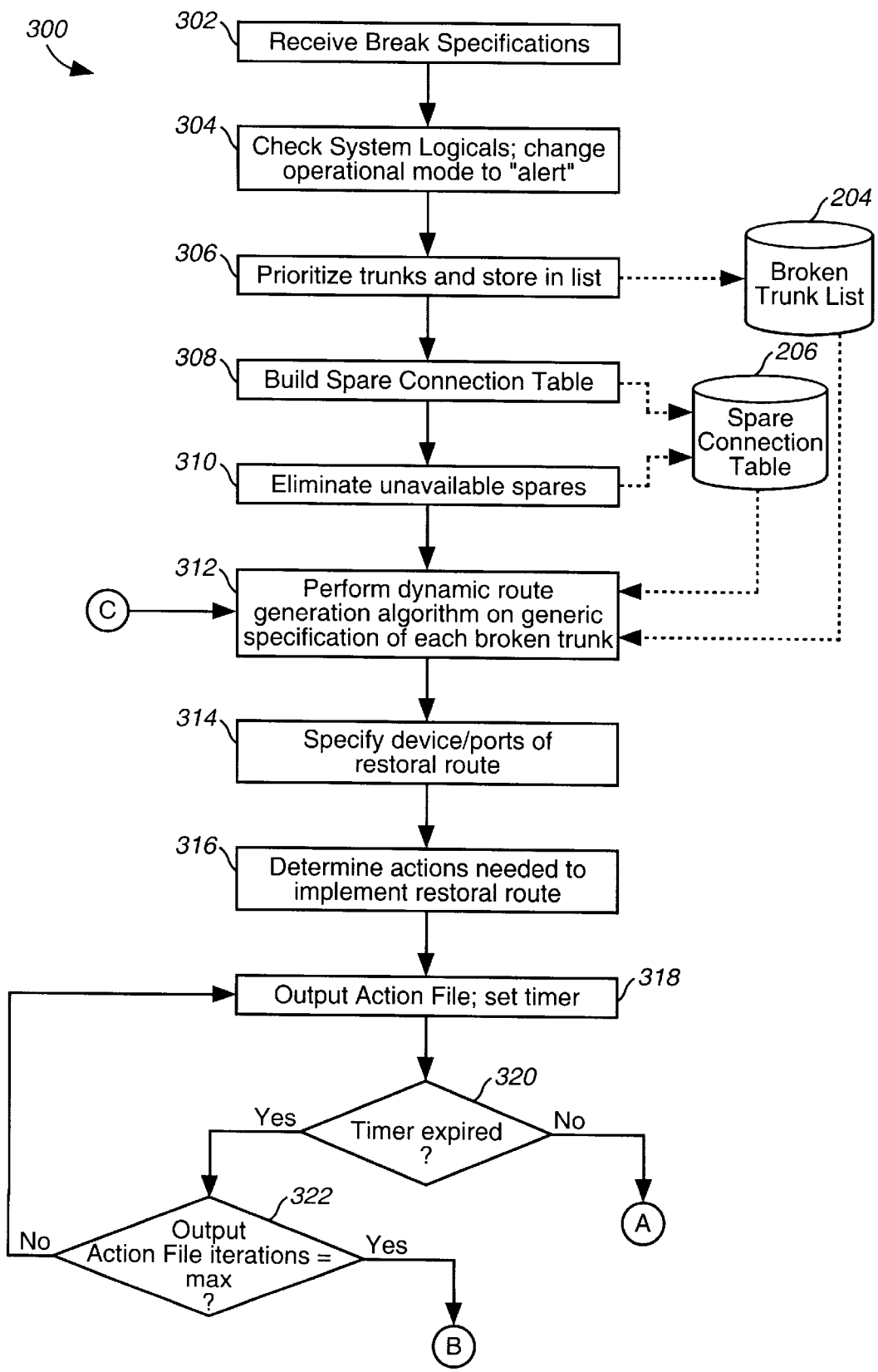
FIGS. 9–11 are flow diagrams of a of a dynamic route generation process of the present invention.
Figure 10:
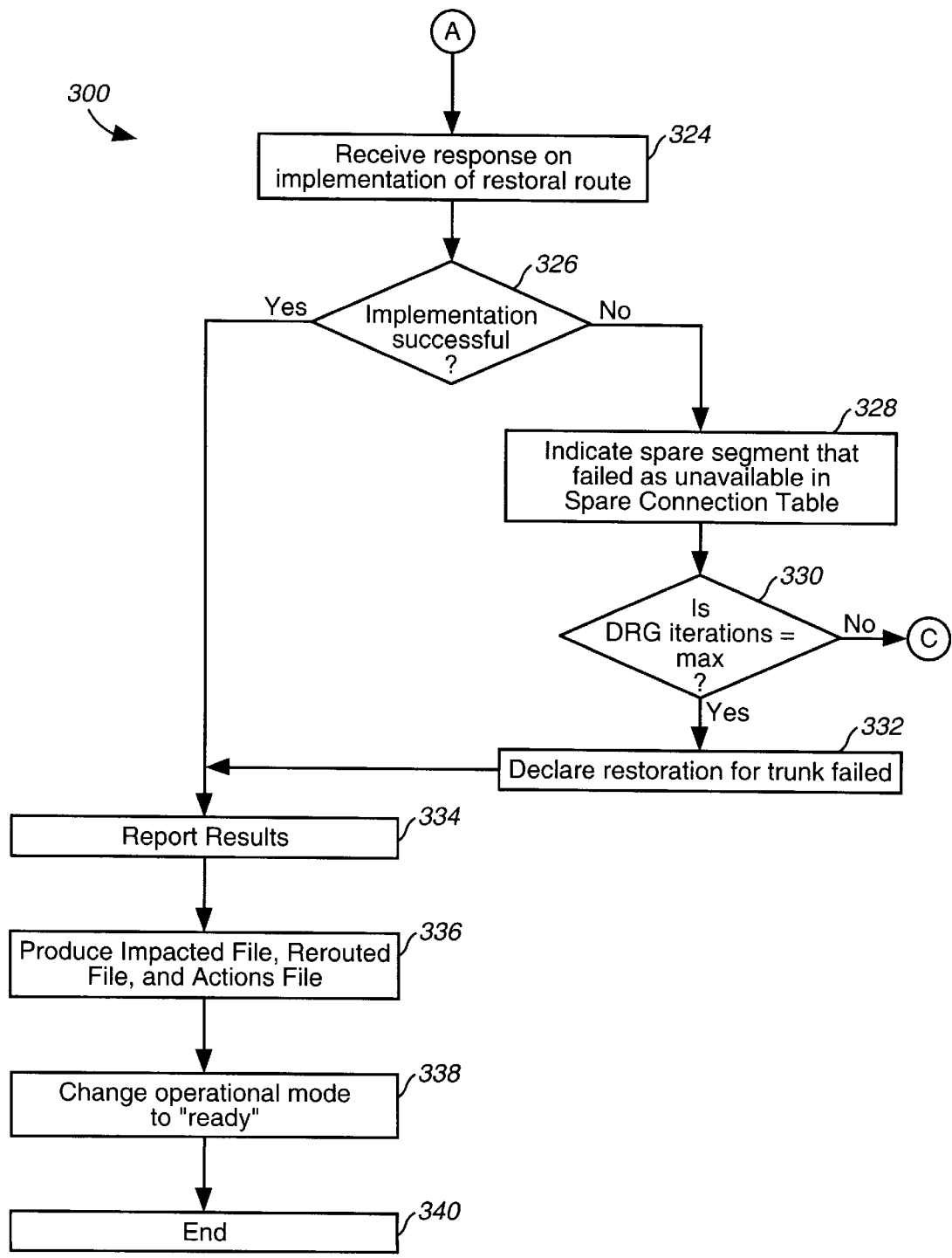
Figure 11:
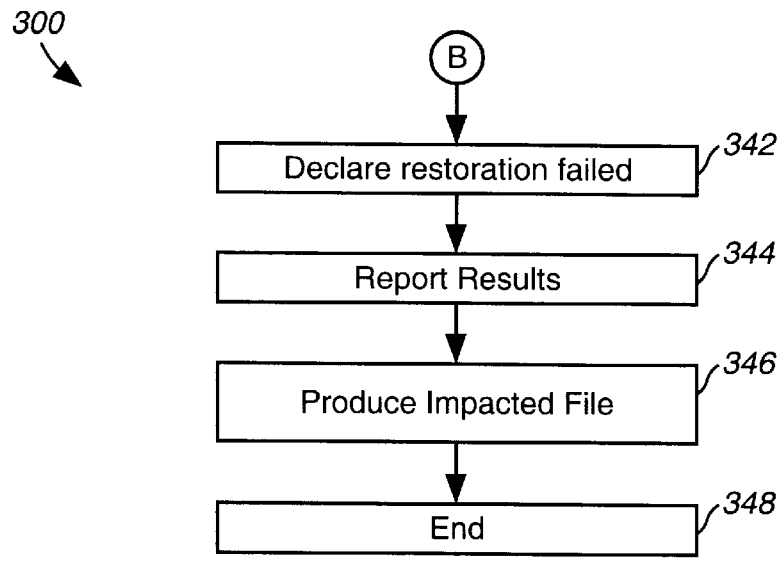

FIGS. 9 through 11 are flowcharts illustrating the detailed process performed by the main process 202 of the DRG 25 and are denoted 300. In step 302, the DRG 25 receives break specifications 102 from the break isolator 66. A break specification 102 contains a trunk identifier, a list of DXCs 12 and port numbers, in logical order, that comprise the trunk 30, and identification of the two DXCs 12 which isolate the outage 402.

When an end of break specification 102 message is received from break isolator 66 then routes are generated for all stored break specifications 102 in priority order. After a restoration route is attempted for a trunk 30, the DRG 25 allows response processing to occur for all trunks 30. This is done to allow a failed, high-priority, trunk 30 to be visited for a new restoration route as soon as possible.

Figure 12:
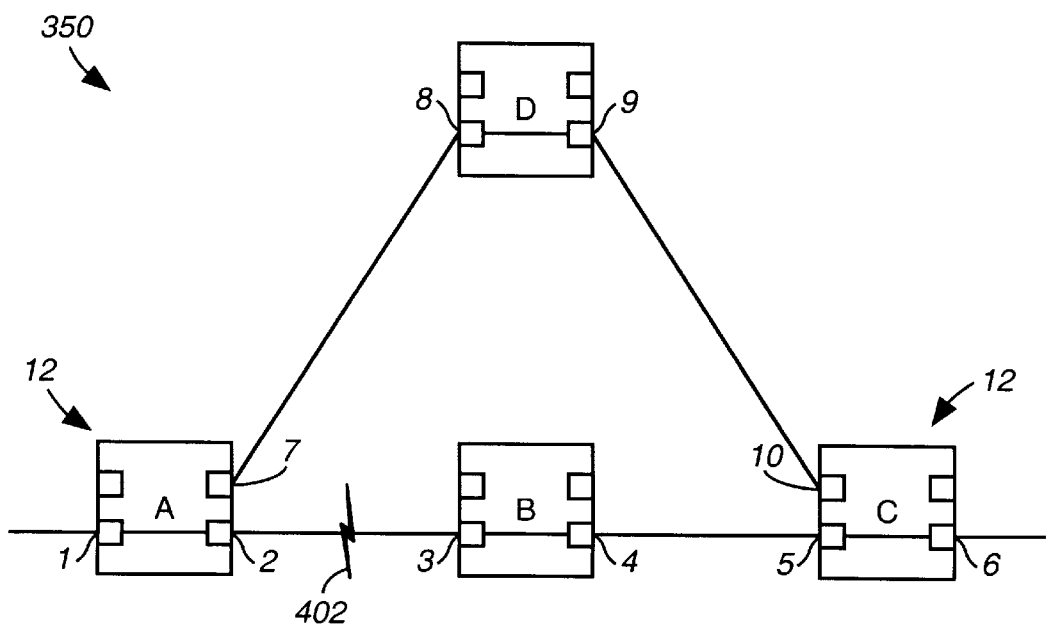
FIG. 12 schematic diagram of switching elements in a communications network.

Referring to an example network topology denoted as 350 in FIG. 12, DXCs 12 are represented by A, B, C, and D. Ports are represented by 1 through 10. A trunk 30 that traverses A, B, and C, has incurred an outage 402 between 12 A and B. A break specification 102 for this trunk 30 may be represented as an array identifying each DXC 12 and port, and denoting the points of outage 402 isolation with an "i", as follows:

(A1, A2i, B3i, B4, C5, C6)

Thus, the DRG 25 knows the DXCs 12 and ports that comprise this trunk 30, and that the outage 402 has occurred between A and B. Break specifications 102 may also be received for spare trunks 30 in alarm 104. These specifications 102 will be used by the DRG 25 to eliminate spare trunk 30 segments.

The receipt of break specifications 102 in step 302 designates a network 14 outage 402 and initiates the main process 202 of the DRG 25.

In step 304, the DRG 25 checks system logicals 210 to determine run-time parameters. System logicals 210 also includes a parameter that specifies if the current instance of the RTR 10 is the primary (as opposed to a backup) instance. System logicals 210 also includes a parameter that specifies if RTR 10 is executing in a dynamic restoration mode.

System logicals 210 may also contain a parameter indicating operational mode. This mode may be set to "ready" or "alert". In step 304, the DRG 25 changes the operational mode to "alert", indicating that restoration is in process. This ensures that all unnecessary processing ceases, so that all system resources may be dedicated to restoration processing.

In step 306, the DRG 25 prioritizes the broken trunks 30 received in the various break specifications 102. For example, DRG 25 may consult with RTNDD 40 to determine the priority level for each trunk 30. The DRG 25 then builds a broken trunk list 204, which is a temporary data store that lists in order of priority each trunk 30 impacted by an outage 402. This will enable the DRG 25 to keep track of the various trunks 30 that require restoration.

As an additional aspect of the present invention, trunks 30 that share the same priority level may also be grouped by common topology. That is, trunks 30 within the same priority group that also traverse the same DXCs 12, are grouped. Thus, these trunks 30 may be input to a dynamic route generation algorithm (step 312) simultaneously. If the trunks 30 share the same topology, then the dynamic route generation algorithm can be performed simultaneously for these trunks 30, thus reducing the processing time for step 312.

In step 308, the DRG 25 builds a spare connection table 206. This table identifies all of the spare capacity that is available for restoration. The DRG 25 queries the RTNDD 40 for all network segments that are designated as spares. A segment refers to a portion of a trunk that spans between two DXCs 12. Segments that are designated spares in the RTNDD 40 are retrieved, along with a type designator. The type designator identifies the type of capacity represented by a segment, and is used to calculate costs of restoration routes.

Referring to the example network topology 350, a traffic trunk 30 traverse A, B, and C. There are shown spare segments between A7 and D8 as well as between D9 and C10. The segments shown may actually consist of several segments, or links, each of which can support a trunk 30.

A sample of spare connection table 206 is shown in FIG. 13 and is denoted generally as 400. This sample shows a table format for the spare segments shown in FIG. 12. Records 440 correspond with DXCs 12, or nodes, in the network 14. Each record indicates, for the node it represents, connectivity with other nodes. The column marked "Node" indicates the node, or DXC 12, corresponding to the record 440. The column marked "End" indicates an other node that is linked, via one or more segments designated as spares, to the first node. There will be an "End" column populated for each second node linked to the first node. The column marked "Links" specifies the number of single-trunk links between the nodes. Under the value for "Links" are the type designators 442 and the number of links allocated to each type.

As shown in FIG. 12, there is spare connectivity from A to D. Therefore, in the spare connection table 400 shown in FIG. 13, the record 440 for A indicates an "End" node of D. For this A-to-D connectivity, there are 2 links. There is one link of type "type-A", and one link of type "type-B". There is spare connectivity from C to D. Therefore, the record 440 for C indicates an "End" node of D. For this C-to-D connectivity, there are 5 links. There are four links of type "type-A", and one link of type "type-B". The record 440 for D shows connectivity to both A (2 links) and C (5 links).

The type designators are used in step 312 to calculate comparative costs of alternate restoration routes. The spare connection table 206 will be used to track all spare capacity available for restoration throughout the restoration process. The spare connection table 206 serves as the main mechanism for ensuring that restoration routes generated for one outage 402 do not interfere (i.e., use the same spare segments) with restoration routes generated for another outage 402. This also ensures that restoration routes generated by the DRG 25 do not interfere with restoration routes generated by another restoration system for the same outage 402, and vice versa.

In step 310, the DRG 25 eliminates from the spare connection table 206 spare segments which are unavailable for restoration. A number of criteria may be used for this.

For example, any spare segments identified by the break isolator 66 in a break specification 102 as being in alarm 104 are eliminated. These spare segments in alarm 104 may have been impacted by an outage 402. Any spare segments with a same path identifier as a broken traffic trunk 30 are eliminated. A path identifier may be used for each trunk 30 or segment (both spares and traffic) to identify the physical route taken by that trunk 30 or segment.

There is a unique path identifier for each physical route. Path identifiers are kept in the RTNDD 40. The DRG 25 retrieves from the RTNDD 40 the path identifier for the broken trunk segments, and then eliminates from the spare connection table 206 any spare segments with the same path identifier. These spare segments share the same physical route as broken trunk segments. However, they may have passed the first criteria, by not being in alarm 104, if the outage 402 is a partial outage 402. A partial outage 402 is one that affects only some of the trunks 30 in a physical route. This may be possible by having a fiber cable, carrying hundreds of trunks 30, partially severed by heat, pressure, or a gnawing animal. If a spare segment on this route is not yet in alarm 104, the spare segment may eventually be impacted when the cause of the outage 402 severs through the entire cable. Therefore, any spare segment that shares the same physical route as broken trunks 30 (as determined with a common path identifier) are eliminated from the spare connection table 206.

Any spare segments that are between the two DXCs 12 identified as the isolation points are eliminated. Spare segments between the two DXCs 12 that were identified by the break isolator 66 as the isolation points of the outage 402 may not actually share the same physical path, and path identifier, as the failed segment. Multiple physical paths that connect the same two DXCs 12 are common. However, these spare segments will not be useful for restoration, since they may traverse the portion of a physical route that is impacted by the outage 402. In other words, while a spare segment may not share the entire physical route, and path identifier, of a broken traffic segment, the spare segment may share a portion of the route, and that portion may be impacted by a partial outage 402. This present criteria eliminates such spare segments, which would have passed the first two criteria.

In one embodiment of the present invention, another spare segment filter criteria is applied prior to the DRG 25 process. Another component of RTR 10 may be responsible for verifying the actual topology of spare segments, and comparing with the topology reflected in the RTNDD 40. If the actual topology is inconsistent with the topology in the RTNDD 40, that spare segment is designated unavailable in the RTNDD 40. This will prevent an action to implement that spare segment for a restoration route that will fail due to unexpected topology.

An additional filter is generated after DRG 25 builds a list of effected trunks 30 and does a spare exclusion from the spare connection table 206, once DRG 25 generates a file of actions 208 and sends the actions 208 to the action dispatcher 70 the DRG 25 waits for responses from DXCs 12. If the DRG 25 receives a failure response response back from the action dispatcher 70, DRG 25 is responsible for excluding the ports of the DRG 25 that failed from the spare connection table 206.

Thus at the conclusion of step 310, the spare segments that remain in the spare connection table 206 are those that are not in alarm 104, that do not share the same path identifier as an effected trunk 30, that are of the correct type for restoration, that do not share the same end nodes as the point of outage 402, that provisioned correctly in the RTNDD 40, and are not actions that failed from a previous restoration attempt.

In step 312, the DRG 25 generates restoration routes for each broken trunk 30 by performing a DRG 25 algorithm. The DRG 25 first specifies each broken trunk in an generic format: an array of DXCs 12, with the DXCs 12 nearest the outage 402 denoted. This simplifies the DRG 25 algorithm by reducing the data required to an absolute minimum. This is a feature that contributes to the present invention's ability to minimize processing time. For the example shown in FIG. 12, the broken trunk specification may be:

(Ai, Bi, C)

in which the three DXCs 12 of the broken trunk are identified in logical order, and the DXCs 12 nearest the outage 402 are denoted with an "i". The DRG 25 then inputs this specification to a DRG 25 algorithm.

The DRG 25 algorithm uses as input the broken trunk specification from the broken trunk list 204, and the spare connection table 206. The DRG 25 can also use as input a file specifying the cost associated with each spare capacity type. When generating possible restoration routes for broken trunk 30, the DRG 25 can use the cost-of-type designation to assess the cost of each restoration route, and then select the restoration route with the minimal cost.

The output of step 312 will be a restoration route for each broken trunk 30. This restoration specification will be in the same format as the broken trunk specification; that is, it will identify the devices, in logical order, of the restoration route. The restoration route does not necessarily have to go between the two DXCs 12 identified as nearest the outage 402. If no spares are available to one or both of these DXCs 12, other devices further from the outage 402 may be used as end points of the restoration route. For example, referring to FIG. 12, the outage 402 has occurred between A and B. However, there are no spare segments available B. Therefore, a restoration route has been identified from A to C, going through D. This may also be a result of costing factors dictating that a restoration route from A to D to C is less costly than restoration route from A to D to B.

The specification of the restoration route in FIG. 12 may be:

(A, D, C)

In step 314, the DRG 25 takes the specification of a restoration route, which identifies the restoration DXCs 12 in logical order, and determines the specific ports of each DXC 12 to be used for the restoration route. Since there is commonly multiple trunk segments between two DXCs 12, there are multiple ports on each DXC 12 that can be used to implement a restoration route.

The determination of which ports to use can be done in various ways. The RTNDD 40 may be queried to determine both available and optimal ports, based on the type designator. The type designator can be used to reflect the comparative costs of each segment. The RTNDD 40 may also be queried to determine which ports are already properly cross-connected to implement the restoration route, thereby reducing the number of network 14 actions needed.

The DRG 25 then specifies both the DXCs 12 and ports that are to be used for each restoration route. The specification of the restoration route in FIG. 12 may now be:

(A1, A7, D8, D9, C10, C6)

The end ports of the restoration route specified above, A1 and C6, are actually ports used in the original traffic trunk 30. Thus, the actions 108 that are necessary to implement the restoration route include cross-connecting port A1 to port A7, and cross-connecting port C10 to port C6.

In Step 316, the DRG 25 determines which actions 108 are needed on the network 14 to implement the restoration route. The DRG 25 uses the restoration route specification from step 314 to determine which ports need to be cross-connected. The DRG 25 then queries the RTNDD 40 to identify which of these actions 108 are already implemented, and which actions, including port disconnects, are needed.

Referring to the example in FIG. 12, it is shown that port D8 is already cross-connected to port D9. This should be reflected in the RTNDD 40. Therefore, the DRG 25 determines in step 316 that the following actions are needed to implement the restoration route:

disconnect port A1 and port A2
cross-connect port A1 and port A7
disconnect port C5 and port C6
cross-connect port C6 and port C10

These actions may be stated in a generic format, as shown above. Using this format enables the present invention to be used in, and adaptable to, a large variety of networks 14, DXCs 12, and restoration systems. The DRG 25 does not need to know what kind of DXCs 12 are being used, or where they are located in the network 14. In the one embodiment, these actions 108 will be sent to network control 36, via an action dispatcher 70. The network control 36 will then translate the actions to commands in a format specific to the intended DXC 12. The network control 36 will also address the commands to the appropriate network 14 addresses of the intended DXCs 12.

In step 318, the DRG 25 compiles a list of all actions 108 identified in step 316, and places them in an action file 78. The DRG then outputs this action file 78 to the action dispatcher 70.

At this time, the DRG 25 sets a timer. This timer, which can be set to any amount (i.e., 60 seconds), is used in case no response is received by the action dispatcher 70. If the timer expires before a response is received, as determined in step 320, the DRG 25 can repeat the output of the action file 78 to the action dispatcher 70. This can be repeated a specified number of times. If the specified number of times has been reached, as determined in step 322, the process proceeds to step 342, of process 341, which will be described below.

As described in reference to FIG. 10 and in nominal operation, a response will be received by the action dispatcher 70 prior to expiration of the timer. In step 324, the DRG 25 receives a response from the action dispatcher 70, indicating whether implementation of the restoration route succeeded or failed. If any action needed to implement the restoration route fails, then the restoration route fails, and a negative response is received in step 324. Step 326 determines if implementation succeeded or failed. If the implementation failed, then in step 328, the DRG 25 indicates the spare segment that failed as being unavailable in the spare connection table 206. This spare segment will thus not be used again in step 312.

If implementation fails, DRG 25 can be repeated a specified number of times (i.e., 5). Step 330 determines if this specified number of iterations has been reached. If not, then the process returns to step 312 to repeat the DRG 25 algorithm. If the specified number of iterations has been reached, then in step 332, the DRG 25 declares that restoration for the trunk 30 has failed, and the process proceeds to step 334. Alternatively, as determined in step 326, implementation succeeds, then the process also proceeds to step 334.

In step 334, the DRG 25 reports results of restoration for each trunk 30. This may be accomplished by sending a message containing results data the reporting component 38 of RTR 10. Results may include routes restored, routes timed out, routes failed, etc.

In step 336, the DRG 25 produces three files for output. An impacted file specifies all broken trunks 30, or those trunks 30 impacted by the outage 402. Identification of these trunks 30 is obtained from the break specifications 102 provided by the break isolator 66. The impacted file can specify simple topology for each trunk 30, as obtained from the RTNDD 40. Alternatively, the impacted file can specify detail topology for each trunk 30 by querying an external topology database containing such detail.

A re-routed file provides specifications of each restoration route implemented. As with the impacted file, this may include simple topology derived from the RTNDD 40, or detailed topology derived from another external database.

An actions file specifies the actions that were issued to implement each restoration route. These actions, produced in step 316, can be used for network 14 normalization. When the cause of the outage 402 has been fixed, the overall restoration system must return the network 14 to the networks 14 original state. This can be done by "undoing" the actions used to implement restoration routes. The actions file can be used for this purpose.

In step 338, the DRG 25 changes the operational mode to "ready", indicating that restoration is complete and that RTR 10 can return to nominal processing. The process ends with step 340.

Returning now to step 322 in FIG. 9, if the timer expires after performing step 318 a specified number of iterations, then the process proceeds to step 342 in FIG. 11.

In step 342, the DRG 25 declares that restoration has failed. In step 344, it reports results as it does in step 334. In step 346, it produces an impacted file, identifying the trunks 30 impacted by the outage 402. Since no restoration occurred, a rerouted file and actions file are not needed. The process ends with step 348.

A key aspect of the DRG 25 is the ability to perform restoration for multiple outages 402, and to perform restoration cooperation with another restoration system. As one aspect of the present invention, these objectives are accomplished in part by generating restoration routes. Through use of the spare connection table 206, the DRG 25 indicates which spares are available by removing spares used in recent restoration routes. If a first outage 402 occurs, and restoration routes for this outage 402 are generated and implemented, the spares used are included in the rerouted file. If a second outage 402 occurs, the DRG 25 builds a new spare connection table 206. However, the DRG 25 will use the rerouted file to identify spares that need to be eliminated because they are in use for the first outage 402. These spares are eliminated from the new spare connection table 206 as part of step 310.

The reroute file may also be provided to a second RTR 10, as it is preferrable to deploy RTR 10 systems to operate in parallel with existing pre-plan restoration systems or with redundant RTR 10 systems. In such an embodiment, a first outage 402 occurs, and restoration routes for this outage 402 are generated and implemented by the DRG 25, the spares used are included in the rerouted file. The rerouted file can then be input to another restoration system. This second restoration system, which may be dynamic or pre-plan, can then perform restoration on portions of the network unavailable to the DRG 25. The restoration system will use the rerouted file to identify spares not available for restoration. This second restoration system can then indicate in a report which spares were used for restoration, and pass this report to the DRG 25. If another outage 402 occurs, the DRG 25 can use this report from the second restoration system to eliminate spares, from the spare connection table 206 in step 310, that were used by the second restoration system for restoration routes.

As another feature to support restoration for multiple failures, the DRG 25 can append trunks 30 from a second outage 402 to the results files from the first outage 402, which are produced in step 336. The impacted file, containing trunks 30 impacted by a first outage 402, can also be used to identify trunks 30 impacted by a second outage 402. This is alternative to producing separate files for each outage 402. The same holds true for the rerouted file and the actions file 78. Use of this feature with the actions file 78 is especially useful for performing a common normalization process for multiple outages.

Another aspect of the DRG 25 is performance of route generation in a timely and efficient manner. One feature employed by the DRG 25 to accomplish this is the representation of multi-hop segments as single segments in the spare connection table 206. When the DRG 25 builds the spare connection table 206 in step 308, the DRG 25 generally identifies each inter-device segment; these are know as single-hop segments, since they only consist of one hop (a hop referring to a connection from one DXC 12 to an adjacent DXC 12. This is reflected in the sample spare connection table 206 in 400, representing the topology shown in 350. Even though port D8 is already cross-connected to port D9, the segment from DXC A to C through D is represented as two segments.

However, the DRG 25 can represent this as a single segment. The DRG 25 can determine from data in the RTNDD 40 that port D8 is already cross-connected to port D9. The DRG 25 can thus represent this in the spare connection table 206 as a single segment from A to C. By doing so, this segment is more likely to be used for a restoration route. By using this segment in a restoration route, no additional actions are needed, since port D8 is already cross-connected to port D9. If another segment from A to D, and another from D to C, are selected for a restoration route, they will require additional actions to implement, thereby taking more time. By representing multi-hop segments as single segments in the spare connection table 206, these segments will more likely be selected for restoration routes. This will result in a decrease in the time required to implement the restoration routes.

Another feature employed by the DRG 25 to increase efficiency and speed in restoration is the grouping of broken trunks 30 with same topology, within the same priority group. This occurs in step 306. When inputting these trunks 30 to step 312, the DRG 25 restores routes for the same trunks, thus reducing the processing time of step 312.

It should also be noted that the DRG 25 can run in demonstration mode. DRG 25 can perform the same process, with the exception that the DRG 25 does not output the action file 78 to the action dispatcher 70 in step 318. The DRG 25 produces an action file 78 exclusively for user review.

Figure 14:
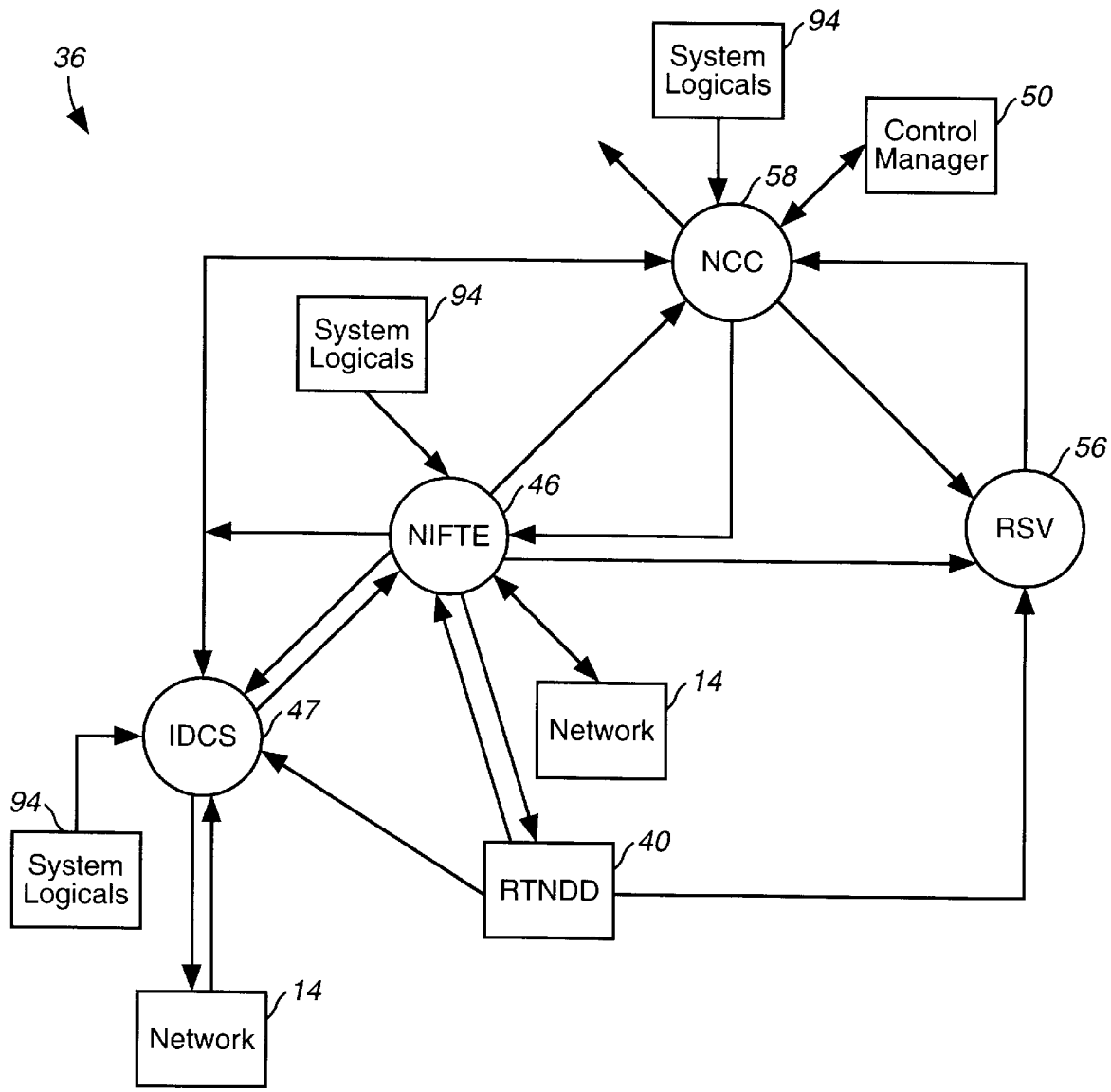
FIG. 14 is a block diagram of a network control component of a network restoration system of the present invention.

FIG. 14 illustrates in detail the logical architecture of network control 36. Network control 36 consists of four primary components, a NCC 58, NIFTE 46, a RSV 56, and an IDCS 47.

The NCC 58 serves as the main interface to and control for network control 36. NCC 58 is responsible for initiating the processing of the other components. In particular, NCC 58 initiates a distinct instance of a NIFTE 46 for each DXC 12 connection. NCC 58 also determines the current readiness mode of the RTR 10, and acts accordingly. When the RTR 10 readiness mode changes from "ready" to "alert", the NCC 58 sends messages to the other components to terminate automatic device audits and topology data updates.

The NCC 58 distributes messages to individual NIFTE 46. However, for the sake of quick performance in the event of an outage, the action dispatcher 70 can send messages directly to the mailboxes of individual NIFTE 46 processes.

The NIFTEs 46 are the interface to the DXCs 12. There is a distinct NIFTE 46 that runs for each DXC 12 that is controlled by RTR 10. NIFTE 46 take action commands from the action dispatcher 70 that are in a generic, internal format. The use of a generic internal format shields the other components of RTR 10 from having to know the specific type of DXC 12 that is at each site. The NIFTE 46 queries the RTNDD 40 with a generic specification of a DXC 12. The RTNDD 40 returns with the specific format to the command needed, which depends on the type of DXC 12 in place. It also returns with the network address of the DXC 12.

The NIFTE 46 can also receive action commands from external control systems 16. These commands are received by the control manager 50, and the control manager 50 sends them either directly to the specific NIFTEs 46, or to the NCC 58. The NIFTEs 46 also manages the communications links with the DXCs 12. These include dual redundant binary data links to each DXC 12 via the network 14, as well as communications over a backup communications network 26.

The IDCS 47 provides the communications interface with the Backup Communications network 26.

The RSV 56 component performs an auxiliary function of the RTR 10. It solicits alarms from spare trunk segments in the network 14. When alarms are received, RSV 56 can determine how these trunks are connected. An alarm is generated by a port, and specifies whether that port is internally cross-connected to another port on the same device. Additionally, by comparing alarms from different ports on different devices, RSV 56 can determine if a port on one device is connected to a port on another device, to determine inter-connectivity.

RSV 56 then compares the topology it has determined from alarms with the topology that is reflected in the RTNDD 40. If the derived topology data for a spare is inconsistent with what is reflected in RTNDD 40, RSV 56 will mark the spare as unavailable for restoral routes. This prevents the route generator 68 from attempting to use the spare in a restoral route, which would most likely result in a failed route implementation since the actual connectivity of that spare is different from what the route generator 68 would assume.

Network control 36 uses a partial list of key messages and are described here in detail. For example, a change execution state command may be sent to the NCC 58. The NCC 58 in turn distributes the message to the other components.

When change readiness mode command is sent to the NCC 58, the NCC 58 distributes the message to the other components. The control manager 50 initiates or terminates, an individual NIFTE 46 process for a single DXC 12 by sending a message to NCC 58. A NCC force audit command may be sent to the NCC 58 by the control manager 50. The NCC 58 passes the message, translated as a NIFTE 46 force audit command, to the NIFTE 46. This command may be provided by an external control system 16, and instructs network control 36 to initiate an audit of one or more DXCs 12. This audit is performed by the NIFTE 46. A NIFTE alarm registration command may be sent to the NIFTE 46 by any number of systems, including external systems via the control manager 50 instructing the NIFTE 46 to send unsolicited DXC 12 alarms to the specified client. The break isolator 66 is a primary such client. A NIFTE 46 port connect command and NIFTE 46 port disconnect command are issued by the action dispatcher 70 to individual NIFTEs 46. They specify port connect and disconnect actions in a generic format. The NIFTE 46 queries the RTNDD 40 to translate these commands to a format that is specific to the DXC 12 that particular NIFTE 46 supports.

A NIFTE 46 data update command is issued to the NIFTE 46 from any number of systems, including internal RTR 10 components, and requests a specific data update to be made to the RTNDD 40, to be performed by the NIFTE 46. A NIFTE data request command is issued to the NIFTE 46 from any number of systems, including internal RTR 10 components, and requests a specific data read from the RTNDD 40, to be performed by the NIFTE 46. A IDCS 47 gateway command is issued by the NIFTE 46 to the IDCS 47 gateway interface to send a command to a DXC 12 using the backup communications network 26. A binary device command is a command issued to a DXC 12 by the NIFTE 46, using the DXC's 12 binary data links accessed by network 14.

A binary device data command is a message sent by a DXC 12 to a NIFTE 46 over the network 14, and includes either a response to a command, a response to an audit, or an unsolicited alarm.

An IDCS 47 message command is issued to a DXC 12 by the NIFTE 46, using the backup communications network 26 via the IDCS 47. An IDCS response is a message sent by a DXC 12 to a NIFTE 46 over the backup communications network 26, and includes either a response to a command, a response to an audit, or an unsolicited alarm.

Figure 15:
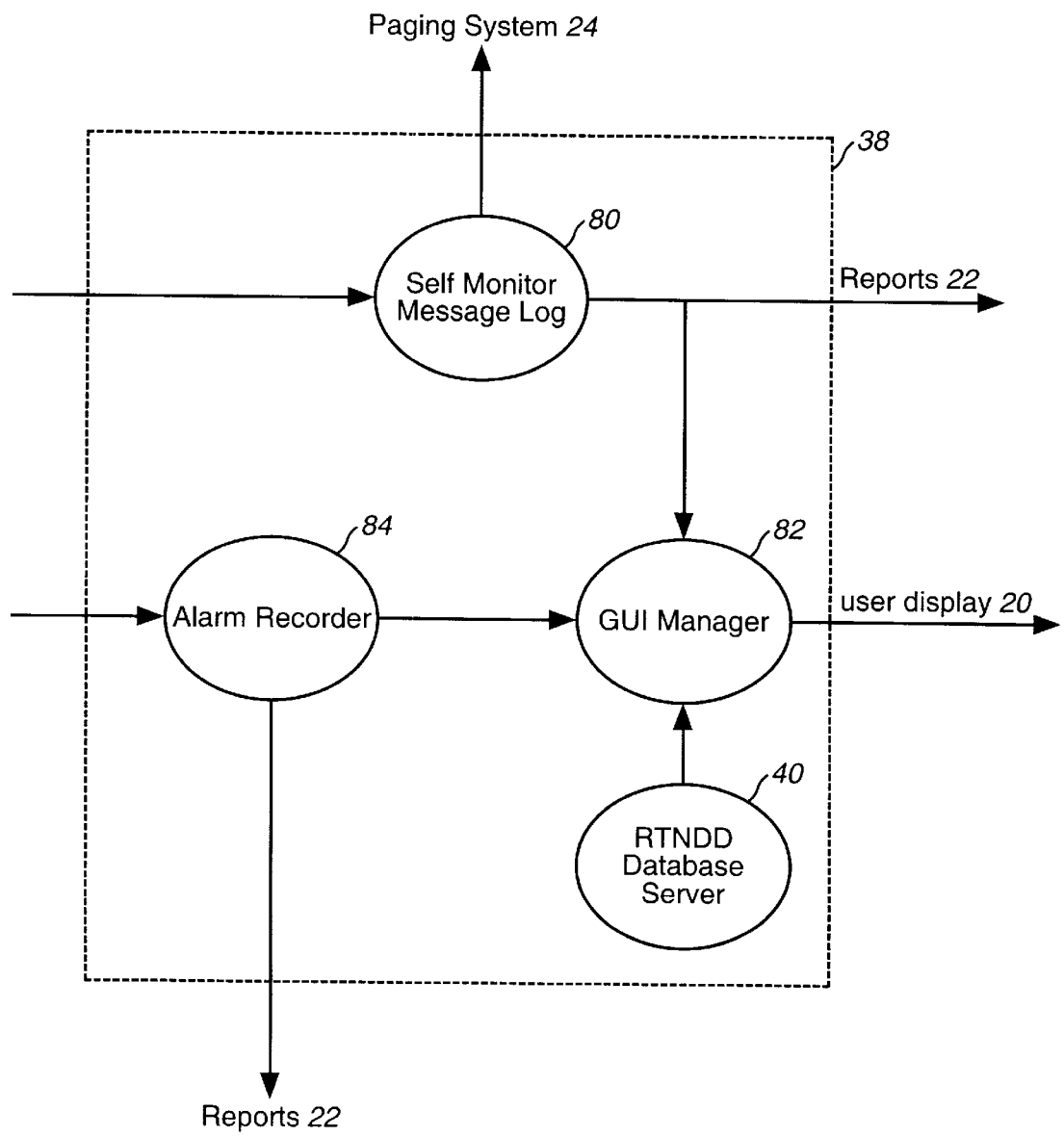
FIG. 15 is a block diagram of a reporting component of a network restoration system of the present invention.

FIG. 15 illustrates the logical architecture of the reporting 38 component. Reporting 38 consists of a self monitor message log 80, which receives error and status messages from each of the other RTR 10 components. These messages are stored in a log file. They can be made available for hard copy and soft copy reports 22. They can also be provided to a GUI manager 82 for output to a user display 20. These messages can also be matched to certain thresholds and message type detectors. If a message of a certain type, or messages that exceed a certain threshold, are detected, a notification to a paging system 24 can be made so as to page the appropriate support personnel.

Reporting 38 also consists of an alarm recorder 84. All alarms received by RTR 10 via network control 36 are recorded in an internal list by the alarm recorder 84. This list can be provided to various reports 22, and to a user display 20 via a GUI manager 82. The GUI manager 82 formats and drives output to a user display 20. The GUI manager 82 can be used to output formatted data from the RTNDD 40. A database server process is incorporated into reporting 38 to provide the GUI manager 82 with RTNDD 40 data.

Therefore, the system and method disclosed herein have inherent advantages over the prior art. While certain embodiments of the invention have been illustrated for the purposes of this disclosure, numerous changes in the arrangement and construction of the parts may be made by those skilled in the art, such changes being embodied within the scope and spirit of the present invention as defined by the appended claims.

What is claimed is:

1. A system for dynamically restoring communications within a network following an outage comprising:

a database containing the configuration of switching elements within said network; and a plurality of instructions resident on a memory device for operating a control computer, said plurality of instructions including a code segment for receiving network parameters following said outage, a code segment for selecting restoration switching elements from said database based upon said network parameters, a code segment for generating connect and disconnect commands for said restoration switching elements, a code segment for building a database of broken network segments based upon said network parameters, and a code segment for sending said connect and disconnect commands to said restoration switching elements, thereby restoring communications within said network.

2. The system as recited in claim 1 wherein said plurality of instructions further includes a code segment for building a database of spare switching elements from said database containing the configuration of switching elements.

3. The system as recited in claim 2 wherein said code segment for building said database of spare switching elements further includes a code segment for updating said database of spare switching elements with real-time information from said database containing the configuration of switching elements.

4. The system as recited in claim 1 wherein said plurality of instructions further includes a code segment for receiving responses from said switching elements and a code segment for updating said database of spare switching elements based upon said responses from said switching elements.

5. A method for dynamically restoring communications within a network following an outage comprising the steps of:

receiving network parameters following said outage;

building a database of broken network segments based upon said network parameters;

obtaining the configuration of switching elements within said network from said database;

selecting restoration switching elements from said database based upon said network parameters;

generating connect and disconnect commands for said restoration switching elements; and sending said connect and disconnect commands to said restoration switching elements, thereby restoring communications within said network.

6. The method as recited in claim 5 further including the step of building a database of spare switching elements from said database containing the configuration of switching elements.

7. The method as recited in claim 6 wherein said step of building said database of spare switching elements further includes updating said database of spare switching elements with real-time information from said database containing the configuration of switching elements.

8. The method as recited in claim 5 further including the step of receiving responses from said switching elements and updating said database of spare switching elements based upon said responses from said switching elements.

9. A system for dynamically restoring communications within a network following an outage comprising:

a database containing the configuration of switching elements within said network; and a plurality of instructions resident on a memory device for operating a control computer, said plurality of instructions including a code segment for receiving network parameters following said outage, a code segment for prioritizing said network parameters, a code segment for building a database of broken network segments based upon said network parameters, a code segment for building a database of spare switching elements from said database containing the configuration of switching elements, a code segment for selecting restoration switching elements from said database containing the configuration of switching elements based upon said network parameters, a code segment for generating connect and disconnect commands for said restoration switching elements, a code segment for sending said connect and disconnect commands to said restoration switching elements, and a code segment for receiving responses from said switching elements.

10. The system as recited in claim 9 wherein said code segment for building said database of spare switching elements further includes a code segment for updating said database of spare switching elements with real-time information from said database containing the configuration of switching elements within said network.

11. The system as recited in claim 9 wherein said plurality of instructions further includes a code segment for updating said database of spare switching elements based upon said responses from said switching elements.

12. The system as recited in claim 9 wherein said code segment for generating connect and disconnect commands further includes grouping said connect and disconnect commands into restoration actions and selecting one of said restoration actions from said group for sending to said restoration switching elements.

* * * * *